(12) United States Patent
Sherman

(10) Patent No.: US 11,958,120 B2
(45) Date of Patent: Apr. 16, 2024

(54) MITER BAR

(71) Applicant: Woodpeckers, LLC, Strongsville, OH (US)

(72) Inventor: Wayne Sherman, Hinckley, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 166 days.

(21) Appl. No.: 17/471,805

(22) Filed: Sep. 10, 2021

(65) Prior Publication Data

US 2023/0082307 A1 Mar. 16, 2023

(51) Int. Cl.
*B23D 47/02* (2006.01)
*B27B 25/10* (2006.01)

(52) U.S. Cl.
CPC .............. *B23D 47/02* (2013.01); *B27B 25/10* (2013.01)

(58) Field of Classification Search
CPC .. B23D 59/002; B23D 47/02; B23Q 17/2233; B27B 25/10
See application file for complete search history.

(56) References Cited

U.S. PATENT DOCUMENTS

| 503,726 | A | * | 8/1893 | Pryibil | B26D 3/185 |
| | | | | | 83/435.15 |
| 2,502,124 | A | * | 3/1950 | Overton | B27B 25/10 |
| | | | | | 83/435.14 |
| 4,158,320 | A | * | 6/1979 | Kay | B27G 5/023 |
| | | | | | 83/435.14 |
| 5,038,486 | A | * | 8/1991 | Ducate, Sr. | B27B 29/00 |
| | | | | | 83/435.14 |
| 5,097,601 | A | * | 3/1992 | Pollak | B23Q 1/262 |
| | | | | | 83/435.14 |
| 5,207,007 | A | * | 5/1993 | Cucinotta | G01B 5/24 |
| | | | | | 33/534 |
| 5,275,074 | A | * | 1/1994 | Taylor | B23Q 1/28 |
| | | | | | 83/438 |
| D351,775 | S | | 10/1994 | Wedler | |
| 5,379,669 | A | * | 1/1995 | Roedig | B23Q 3/007 |
| | | | | | 83/435.14 |
| 5,402,581 | A | * | 4/1995 | Hurd | B23Q 3/005 |
| | | | | | 33/640 |
| D428,899 | S | | 8/2000 | Brutscher et al. | |

(Continued)

FOREIGN PATENT DOCUMENTS

| CA | 2177640 A1 * | 8/1997 | |
| CN | 201491461 U * | 5/2010 | |
| DE | 102008050475 A1 * | 4/2010 | B27B 25/10 |

*Primary Examiner* — Jonathan G Riley
(74) *Attorney, Agent, or Firm* — Sand, Sebolt & Wernow Co., LPA

(57) ABSTRACT

This disclosure is directed to a miter gauge and methods of use thereof. Generally, this disclosure is related to a miter bar of a miter gauge that includes at least one spacer member which applies pressure to a side of a channel defined within a worktable. The application of this pressure by the at least one spacer member enables the miter bar to remain in a substantially constant position between the first side and second side of the channel and reduces the degree of play between the miter bar and the first and second sides of the channel. Retainer members are provided on a bottom of the miter bar to aid in preventing the miter bar from lifting vertically out of the channel during use.

27 Claims, 14 Drawing Sheets

(56) References Cited

U.S. PATENT DOCUMENTS

| | | | | |
|---|---|---|---|---|
| 6,237,457 | B1 * | 5/2001 | Taylor | B23D 47/02 83/435.11 |
| 6,665,946 | B1 * | 12/2003 | Reilly | B23D 59/002 33/640 |
| 6,776,076 | B2 | 8/2004 | Salazar | |
| 7,245,199 | B1 * | 7/2007 | Reilly | B27B 27/00 33/DIG. 1 |
| 7,421,798 | B2 | 9/2008 | Pattee | |
| D635,001 | S | 3/2011 | Adkins | |
| 8,661,954 | B1 * | 3/2014 | Quayle | B27B 27/10 83/435.14 |
| D827,460 | S | 9/2018 | Lindberg et al. | |
| 10,166,692 | B2 | 1/2019 | Frolov | |
| D913,068 | S | 3/2021 | Chan | |
| D951,785 | S | 5/2022 | Turley | |
| D957,964 | S | 7/2022 | Cross | |
| 2004/0099115 | A1 * | 5/2004 | Salazar | B27B 27/08 83/435.14 |
| 2005/0279200 | A1 * | 12/2005 | Duginske | B27B 25/10 83/471.3 |
| 2006/0201298 | A1 * | 9/2006 | Smith | B27B 25/10 83/468 |
| 2018/0036905 | A1 * | 2/2018 | Frolov | B27B 25/10 |
| 2020/0306846 | A1 * | 10/2020 | Smith | B27B 27/02 |
| 2021/0001419 | A1 * | 1/2021 | Smith | B27G 5/023 |

* cited by examiner

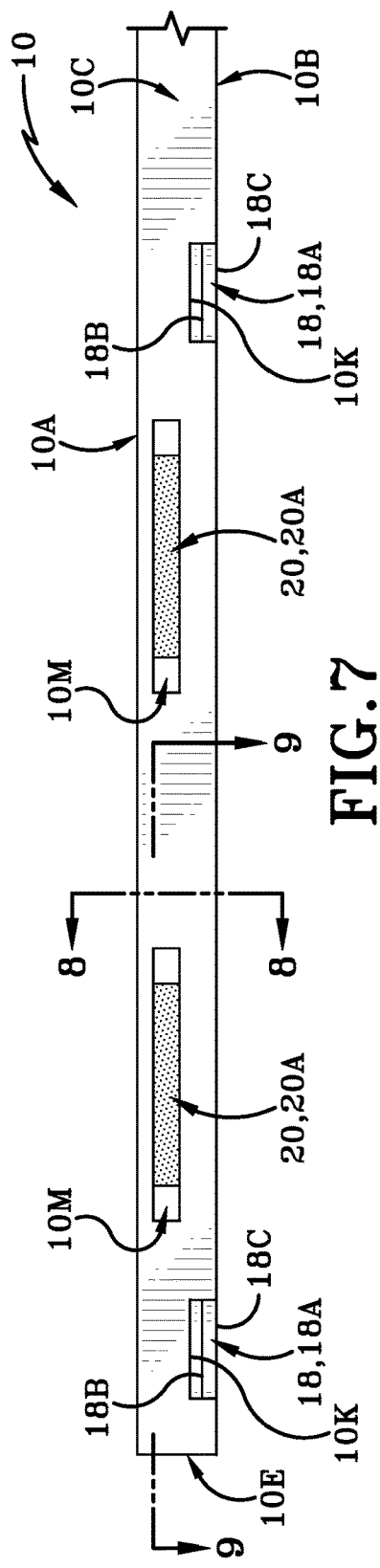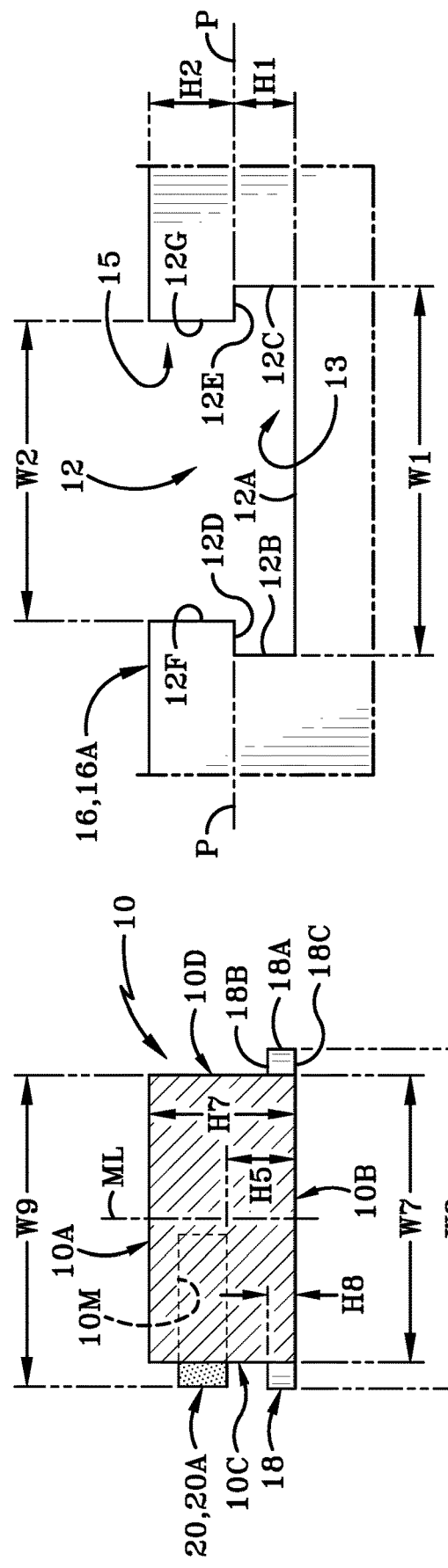

MITER BAR

TECHNICAL FIELD

This disclosure is directed to woodworking tools and methods of operation thereof. Generally, this disclosure is related to miter gauges used to guide a workpiece past cutting, grinding, or sanding equipment, where the miter gauge includes a miter bar receivable within a channel or miter slot defined in a worktable. Specifically, this disclosure is directed to a miter bar including one or more spacer members that apply a force to a side wall of the worktable which defines the channel, thereby minimizing play between the miter bar and the channel, and enabling the miter bar to remain in a relatively constant and axially-aligned orientation within the channel during use.

BACKGROUND

Background Information

Miter gauges are woodworking tools that are used to guide workpieces through a machine in order to size, shape, or otherwise work the workpiece. The machines may include working equipment such as table saws, band saws, sanding machines, grinders, shapers, routers, and the like. In some applications miter gauges are used when making angled cuts in workpieces. Two workpieces having complementary angled cuts may be joined to one another in what is called a "miter joint. Miter joints give finished products an aesthetically pleasing appearance.

A miter gauge typically includes a miter bar or base rail that is received within and is movable along a channel defined in a worktable of the working machine. The channel is arranged parallel to a working element on the working machine. A vertical fence and/or miter head is provided at one end of the miter bar. The vertical fence is arranged perpendicular to a top surface of the miter bar and the miter head is typically a semi-circular component having a scale marked for various angles. The fence and/or miter head may pivot relative to the miter bar to allow the craftsman to adjust an angle at which a workpiece will be retained relative to the working element.

Prior to use, a free end of the miter bar is introduced into the channel in the worktable. The miter head may be selectively rotated relative to the miter bar to a desired scale marking in order to orient the fence at a desired preset angle relative to the working element. The workpiece to be worked is butted up against the vertical fence and the craftsman applies a pushing force to the miter gauge in order to slide the miter bar longitudinally along the channel. As the miter bar travels along the channel, the workpiece is moved past the working element and is thereby cut, sanded, ground, buffed etc., at the preset angle depending on the type of machine being utilized.

Most miter heads include a circular slot concentric with a pivot which couples the miter head to the miter bar, a compass scale indexing the circular slot and a thumbscrew or other position-locking mechanism to secure or set the miter head at a desired angle relative to a longitudinal axis of the miter bar. Utilizing the compass scale should allow the craftsman to make the desired angled cut. However, the accuracy of the angular position achievable with such equipment is affected by a degree of play of the miter bar within the worktable channel. In previously known miter gauges when a craftsman applies a pushing force to the device to move the workpiece relative to the working element, the pushing force tends to make the miter bar wiggle within the channel. The miter bar might move laterally towards one side of the channel or the other, or may become angularly skewed within the channel. This "play" between the miter bar and the channel typically causes the working element to cut, sand or grind the workpiece at a slightly different angle from that initially set on the miter head's scale. The end result may be that the two workpieces which were supposed to include complementary cuts, do not have complementary cuts and therefore cannot be readily joined to one another in an aesthetically pleasing miter joint.

One past solution to this problem is proposed by Taylor (U.S. Pat. No. 6,237,457). Taylor discloses the installation of a plurality of split washer assemblies on an upper surface of the miter bar of a miter gauge. The split washer is adjusted after the miter bar is inserted into the worktable channel by rotating a screw that secures the split washer to the miter bar. If the screw is rotated in a first direction, the overall dimensions of the split washer will increase and thereby occupy more of the channel. This arrangement may somewhat reduce play between the miter bar and the channel. However if the adjustment of the various split washer assemblies is not relatively equal along the length of the miter bar, the miter bar may be retained at a slightly skewed angle within the worktable channel by the split washers. This arrangement can cause the miter bar to bind up in the channel when the craftsman pushes on the miter gauge to move the workpiece passed the working element. If the miter bar manages to move along the channel, the skew miter bar within the channel may cause the workpiece being worked to be cut or sanded, for example, at an incorrect angle. For example, if the miter gauge is used with a table saw to cut two workpieces in order to form a miter joint, retaining the miter bar slightly skew in the worktable channel will result in cuts being made in the workpieces at a slightly incorrect angle. Ultimately, the cut edges of the two workpieces may not be sufficiently complementary to enable the cut edges of the two workpieces to form a miter joint.

SUMMARY

The miter bar in accordance with the present disclosure is configured to reduce play of the miter bar within a channel defined in a worktable. In other words, the presently disclosed miter bar is configured to reduce a tendency of the miter bar to shift laterally or angularly relative to surfaces of the worktable which define the channel.

In one aspect, an exemplary embodiment of the present disclosure may provide a tool for material processing comprising an elongate body having a top and an opposed bottom, and a first side and a second side extending between the top and bottom; at least one spacer member provided on the first side of the body and having an outer wall which extends at least partially outwardly beyond the first side of the body, wherein the outer wall is movable between a first position and a second position relative to the first side; and when in the first position, the outer wall is located further outwardly from the first side than when in the second position.

In one embodiment, the at least one spacer member may be fabricated from a resilient material that deforms under application of a force thereto and returns to an original shape and size when the force is removed. In one embodiment, the at least one spacer member may be located a distance vertically away from the bottom of the elongate body. In one embodiment, the elongate body may further include a first end, a second end longitudinally opposed to the first end, wherein the first end and second end extend between the first side and the second side; and the at least one spacer member may comprise a first spacer member and a second spacer member spaced a distance longitudinally away from the first spacer member. In one embodiment, the tool may further comprise at least one retaining member provided on the elongate body a distance longitudinally from the at least one spacer member. In one embodiment, the at least one retaining member may be provided on the bottom of the elongate body. In one embodiment, the at least one retaining member may extend laterally outwardly beyond the first side and the second side of the elongate body. In one embodiment, the at least one retaining member may extend laterally outwardly beyond the first side of the elongate body and further beyond the at least one spacer member when in the first position and in the second position. In one embodiment, the at least one retaining member may be longitudinally offset relative to the at least one spacer member. In one embodiment, the tool may further comprise a fence provided on the body, and the fence may be oriented orthogonally to the top of the body. In one embodiment, the fence may be selectively adjustable about an axis orthogonal to a longitudinal axis of the elongate body. In one embodiment, the elongate body may be of a width proximate the top, where the width is measured between the first side and the second side, and wherein at least a portion of the elongate body proximate the bottom thereof is of a greater width than the width proximate the top. In one embodiment, the at least one spacer member may be flexible and fabricated from spring steel. In one embodiment, the at least one spacer member may be compressible. In one embodiment, the elongate body may be of a length of from about 22 up to about 26 inches.

In one aspect, an exemplary embodiment of the present disclosure may provide a method of working a surface of a workpiece comprising inserting a bar between a first side and a second side of a channel defined in a worktable; providing at least one spacer member on a first side of the bar; applying a force to the first side of the channel with the at least one spacer member; holding the second side of the bar in contact with the second side of the channel; moving the bar longitudinally within the channel while holding the second side of the bar in contact with the second side of the channel; operatively engaging a workpiece with the bar, contacting the workpiece with a working element on the worktable; and working the surface on the workpiece with the working element.

In one embodiment, the method may further comprise applying a first force to at least one spacer member with the first side of the channel prior to applying the force to the first side of the channel with the at least one spacer member. In one embodiment, the method may further comprise laterally moving the bar towards the second side of the channel prior to holding the second side of the bar in contact with the second side of the channel. In one embodiment, applying the force may further comprise moving the at least one spacer member from an extended position relative to the first side of the bar to a depressed position relative to the first side of the bar. In one embodiment, applying the force may further comprise depressing a flexible outer wall of the at least one spacer member inwardly to move the outer wall from a first distance away from the first side of the bar to a second distance away from the first side of the bar. In one embodiment, the method may further comprise maintaining a constant gap between the first side of the bar and the first side of the channel with the at least one spacer member. In one embodiment, the method may further comprise sliding the bar along a bottom of the channel. In one embodiment, the method may further comprise resisting twisting of the bar within the channel with the at least one spacer member. In one embodiment, the method may further comprise inserting a first region of the bar into a first region of the channel; inserting a second region of the bar into a second region of the channel, wherein the first region of the bar is wider than the second region of the bar; and placing the first region of the bar in contact with a bottom of the channel. In one embodiment, inserting the first region of the bar may into the first region of the channel may further comprise contacting the bottom of the channel with at least two retaining members provided on the bottom of the bar.

In one aspect, an exemplary embodiment of the present disclosure may provide a tool for material processing comprising: an elongate body with a first side and a second side, wherein the tool is adapted to be engaged between a first side and a second side of a channel of defined in a worktable; and at least one spacer member located on the first side of the body and operative to contact the first side of the channel and present a force to allow the second side of the body to contact the second side of the channel. This embodiment or another exemplary embodiment may provide a first end, a second end longitudinally opposed to the first end wherein the first end and second end extend between the first side and second side; wherein the at least one spacer member comprises a first spacer member and a second spacer member spaced a distance longitudinally from the first spacer member. This embodiment or another exemplary embodiment may provide a miter head located proximate the second end of the elongate body. This embodiment or another exemplary embodiment may provide the miter head is selectively adjustable about an axis orthogonal to a longitudinal axis of the elongate body. This embodiment or another exemplary embodiment may provide wherein the elongate body comprises a first region and a second region, wherein the first region has a first width measured between the first side and the second side of the elongate body; and wherein the second region has a second width measured between the first side and second side of the elongate body and the second width is greater than the first width; and wherein the at least one spacer member is located on the first region. This embodiment or another exemplary embodiment may provide a top and a bottom vertically disposed from the top, wherein the second region is located proximate the bottom. This embodiment or another exemplary embodiment may provide the second region of the elongate body comprises at least one retaining member that is located proximate a bottom of the first region. This embodiment or another exemplary embodiment may provide the combined width of the first region of the body of the tool and at least one spacer member is greater than a first width between the first side and the second side of the channel when the at least one spacer member is in an extended position and a second width when the at least one spacer member is in a depressed position. This embodiment or another exemplary embodiment may provide the at least one spacer member is movable between an extended position and a depressed position and extends beyond the first side of the elongate body in an extended position. This embodiment or another exemplary embodiment may provide the first region is adapted to be received within a first region of the channel wherein the at least one spacer member extends beyond the first side of the elongate body to a lesser extent when in the depressed position. This embodiment or another exemplary embodiment may provide the at least one spacer member comprises a flexible material. This embodiment or another exemplary embodiment may provide the flexible material has a Shore A hardness between about 5 and about 80. This embodiment or another exemplary embodiment may provide the flexible material has a Shore D hardness between about 12 and about 29. This embodiment or another exemplary embodiment may provide the elongate body has a length between about 22 and about 26 inches.

In another aspect, an exemplary embodiment of the present disclosure may provide a method for making straight cuts on a workpiece comprising inserting a bar between a first side and a second side of a first channel defined in a worktable; providing at least one spacer member on a first side of the bar; applying a first force to the first side of the channel from the spacer member; and engageably holding the bar within the channel through an opposite force applied by the second side of the first channel to a second side of the bar. This embodiment or another exemplary embodiment may provide aligning a miter head located on the bar with the workpiece. This embodiment or another exemplary embodiment may provide wherein applying the first force comprises: moving the at least one spacer member from an extended position relative to the first side of the bar to a depressed position relative to the first side of the bar with a second width. This embodiment or another exemplary embodiment may provide wherein inserting further comprises: inserting a first region of the bar into a first region of the channel; inserting a second region of the bar into a second region of the channel, wherein the second region of the bar is wider than the first region of the bar; and placing the second region of the bar in contact with a bottom of the channel. This embodiment or another exemplary embodiment may provide sliding the bar along the bottom of the channel. This embodiment or another exemplary embodiment may provide removing the bar from the first channel defined in the worktable and placing in a second channel in the worktable. This embodiment or another exemplary embodiment may provide resisting twisting of the bar within the channel with the spacer member. This embodiment or another exemplary embodiment may provide engaging at least two retaining members with the bottom of the channel.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 7 is a right side view of the enlarged portion of the miter bar shown in FIG. 5.

FIG. 8 is a cross-section of the miter bar shown looking in the direction of line 8-8 of FIG. 7.

FIG. 10 is an end view of a channel defined in the worktable and configured to receive the miter bar therein.

Similar numbers refer to similar parts throughout the drawings.

DETAILED DESCRIPTION

Figure 1A:
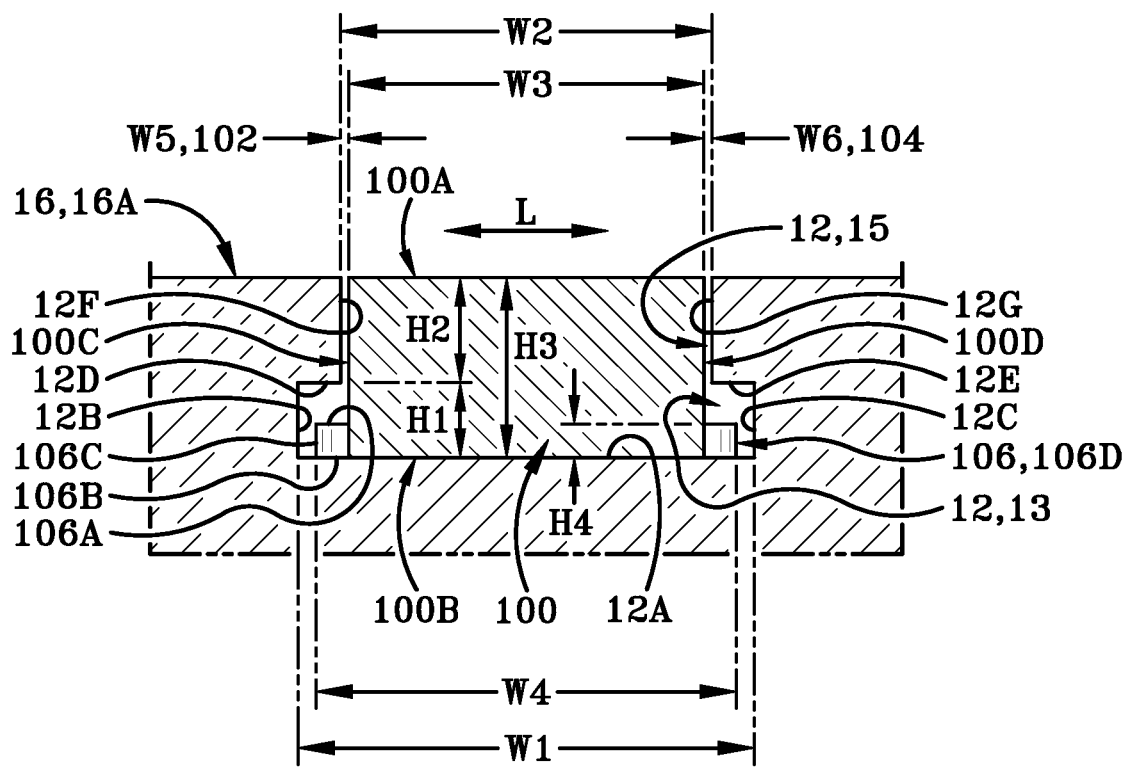
FIG. 1A is a lateral cross-sectional view of a PRIOR ART miter bar seated within a longitudinally-oriented channel defined in a worktable of a wood working machine.
Figure 1B:
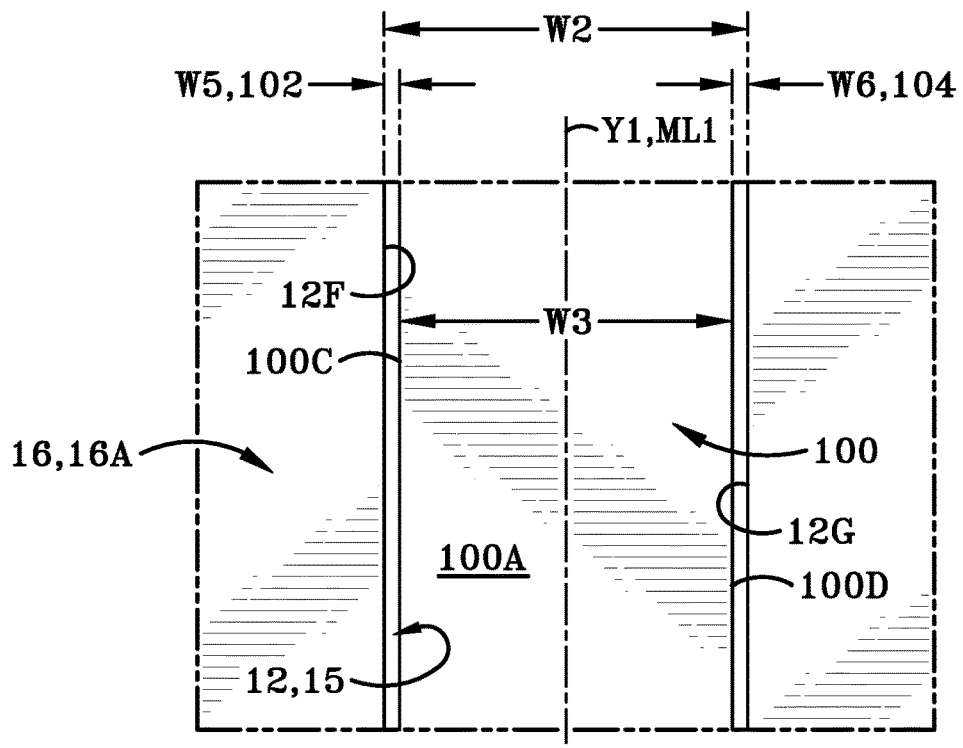
FIG. 1B is a partial top plan view of the PRIOR ART miter bar seated within the channel illustrated in FIG. 1A, showing the PRIOR ART miter bar oriented generally parallel to a longitudinal axis of the channel.
Figure 1C:
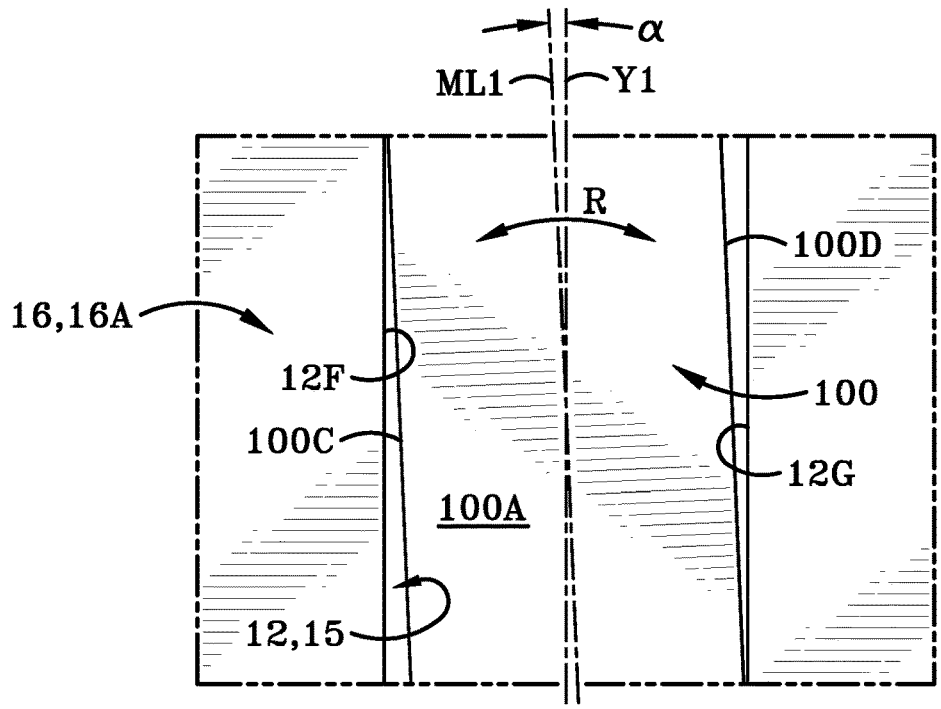
FIG. 1C is a partial top view of the PRIOR ART miter bar and channel illustrated in FIG. 1B but showing the miter bar after a pushing force has been applied thereto and showing the miter bar oriented at an angle relative to the longitudinal axis of the channel.

FIGS. 1A-1C show a length of a PRIOR ART miter bar 100 disposed within in an exemplary channel 12 (or miter slot 12) defined in an upper surface 16A of an exemplary worktable 16. Although not illustrated in these three figures, channel 12 originates in an opening defined in a front end of the worktable 16 and will extend for a distance rearwardly toward a rear end of the worktable 16. In many instances, channel 12 will terminate in an opening defined in the rear end of the worktable 16. Channel 12 will therefore be of a length measured between the front end of the worktable and the rear end thereof. The configuration of channel 12 is exemplary of typical channels or miter slots formed in worktables 16 of a wide variety of different working equipment that may be used, for example, to cut, shape, sand, grind, or buff workpieces.

FIG. 1A shows that channel 12 includes a wider first region 13 and a narrower second region 15. Second region 15 of channel 12 originates in upper surface 16A of worktable 16 and extends downwardly for a distance into the worktable 16. The wider first region 13 is located a distance inwardly from upper surface 16A and is oriented generally parallel to upper surface 16A. This configuration gives channel 12 an inverted T-shape in cross-section.

Referring still to FIGS. 1A to 1C, channel 12 is bounded and defined by a bottom surface 12A, a first side surface 12B, a second side surface 12C, a first shoulder 12D, a second shoulder 12E, a third side surface 12F, and a fourth side surface 12G. First side surface 12B, first shoulder 12D, and third side surface 12F make up a first side of the channel 12. Second side surface 12C, second shoulder 12E, and fourth side surface 12G make up a second side of the channel 12. First side surface 12B and second side surface 12C are arranged parallel to one another, extend orthogonally upwardly from opposite ends of bottom surface 12A, and are spaced laterally apart from one another. First side surface 12B and second side surface 12C are of substantially equal heights and each terminates in an upper end located remote from bottom surface 12A.

First shoulder 12D extends inwardly from the upper end of first side surface 12B and is arranged orthogonal to first side surface 12B. Second shoulder 12E extends inwardly from the upper end of second side surface 12C and is arranged orthogonal to second side surface 12C. First shoulder 12D and second shoulder are oriented generally parallel to bottom surface 12A, extend laterally inwardly towards one another, and are horizontally aligned with one another in a same plane. First shoulder 12D and second shoulder terminate in inner ends that are located a lateral distance away from one another.

Third side surface 12F extends upwardly and outwardly from the inner end of first shoulder 12D. Fourth side surface 12G extends upwardly and outwardly from an inner end of second shoulder 12E. Third side surface 12F of is orthogonal to first shoulder 12D and fourth side surface 12G is orthogonal to second shoulder 12E. Third and fourth shoulders 12D, 12E are arranged parallel to one another, are laterally spaced apart from one another, and are of generally a same height as one another. Third side surface 12F and fourth side surface 12G terminate at upper surface 16A of worktable 16. An opening to channel 12 is defined in the upper surface 16A of worktable 16 between the terminal ends of third side surface 12F and fourth side surface 12G. The opening is in fluid communication with second region 15, which in turn is in fluid communication with the first region 13.

First region 13 is of a first width "W1" and a first height "H1". Second region 15 is of a second width "W2" and a second height "H2". The second width "W2" is smaller than the first width "W1" and the second height "H2" is greater than the first height "H1". The first width "W1" (FIG. 1A) of channel 12 is measured laterally between first side surface 12B and second side surface 12C, and the first height "H1" is measured vertically between bottom surface 12A and a plane along which shoulders 12D, 12E are aligned with one another. The narrower second width "W2" of channel 12 is measured laterally between third side surface 12F and fourth side surface 12G, and the second height "H2" is measured vertically between the common plane along which shoulders 12D, 12E are arranged and upper surface 16A of worktable 16. As is evident from FIG. 1A, the opening to channel 12 defined in upper surface 16A of the worktable 16 is of the narrower second width "W2". The first shoulder 12D and second shoulder 12E transition between the wider first region 13 of the channel 12 and the narrower second region 15 thereof. Although not illustrated herein, it will be understood that channel 12 will be of a length that typically is measured between the front end and rear end of the worktable 16.

It will be understood that channel 12 may be machined by different manufacturers in different countries to different specifications. As a result, the widths "W1" and "W2" of first and second regions 13, 15 and the heights "H1" and "H2" may be other than the configuration illustrated in FIGS. 1A-1C. The PRIOR ART miter bar 100 that is inserted into channel 12 will typically be selected to be of a generally complementary cross-section to the cross-section of channel 12. However, depending on the dimensions of first region 13 and second region 15, there may more "play" or less "play" between the PRIOR ART miter bar 100 and the channel 12. The more "play" there is between the PRIOR ART miter bar 100 and channel 12, the more likely that a working element of the working equipment will form a surface in the workpiece that is at an undesirable angle.

As illustrated in FIGS. 1B and 1C, channel 12 has a longitudinal axis "Y1" which extends from a first end of channel 12 located at the front end of the worktable (not shown in these figures) to a second end of channel 12 located at the rear end of the worktable 16 (not shown in these figures).

Referring still to FIGS. 1A, 1B, and 1C, the PRIOR ART miter bar 100 is an elongate member having a top 100A, a bottom 100B vertically opposed to the top 100A, a first side 100C and an opposed second side 100D extending between top 100A and bottom 100B. Top 100A and bottom 100B are parallel to one another and orthogonal to first side 100C and second side 100D. Although not illustrated herein, PRIOR ART miter bar 100 also has a first end orthogonal to top and bottom 100A, 100B and to first and second sides 100C, 100D.

PRIOR ART miter bar 100 is of a height "H3" measured vertically from top 100A to bottom 100B and is of a width "W3" measured laterally from first side 100C to second side 100D. FIG. 1A shows height "H3" is greater than either of the heights "H1" or "H2" of channel 12. As illustrated, height "H3" is generally equal to height "H1" plus height "H2". However, in other instances (not shown herein (height "H3" of PRIOR ART miter bar 100 may be less than height "H1" plus height "H2". The width "W3" of PRIOR ART miter bar 100 is smaller than the width "W2" of the narrower second region 15 of channel 12 and is obviously thereby also smaller than the width "W1" of first region 13 of channel 12. As a consequence, PRIOR ART miter bar 100 is able to be received within the narrower second region 15 of the channel 12 and extend all the way down to bottom 12A of channel 12.

As illustrated in FIG. 1A, PRIOR ART miter bar 100 also includes a retaining member 106 positioned so as to be received in the wider first region 13 of channel 12. Retaining member 106 extends laterally outwardly beyond first side 100C and second side 100D of PRIOR ART miter bar 100 for a distance. Retaining member 106 may be provided at any location along the length of PRIOR ART miter bar 100. In one example, retaining member 106 may be provided at a free end of the PRIOR ART miter bar 100 a distance away from a miter head and/or fence not shown).

Retaining member 106 includes a top 106A, an opposed bottom 106B, a first side 106C and an opposed second side 106D. Retaining member 106 is of a height "H4" measured vertically between top and bottom 106A, 106B, and is of a width "W4" measured laterally between a first side 106C and second side 106D of retaining member 106. Height "H4" of retaining member 106 is less than the height "H1" of first region 13 and width "W4" is greater than the width "W3" of the PRIOR ART miter bar 100. Width "W4" is also greater than the width "W2" of the narrower second region 15 of channel 12 but is less than the width "W1" of the first region 13 of channel 12.

By providing retaining member 106 on PRIOR ART miter bar 100, the overall cross-sectional shape of the miter bar looking in the direction of retaining member 106 (as in FIG. 1A) is substantially similar to the inverted T-shaped cross-section of channel 12. Retaining member 106 helps to ensure that when PRIOR ART miter bar 100 is engaged in channel 12, the miter bar 100 will not tend to move vertically upwardly through the opening defined in upper surface 16A of worktable 16 and thereby slip out of channel 12.

As best seen in FIG. 1B, if PRIOR ART miter bar 100 is located generally centrally within channel 12, an imaginary midline "ML1" of the PRIOR ART miter bar 100 will be aligned with the longitudinal axis "Y1" of channel 12. The imaginary midline "ML1" is equidistant between first side 100C and second side 100D and extends between a first end (not shown) and second end (not shown) of the miter bar. In this position within channel 12, a gap 102 is defined between first side 100C of PRIOR ART miter bar 100 and third side surface 12F of the worktable 16. Similarly, a gap 104 is defined between second side surface 100D of PRIOR ART miter bar 100 and fourth side surface 12G of the worktable 16. Gap 102 is indicated in FIG. 1A to be of a width "W5" and gap 104 is indicated to be of a width "W6". When miter bar 100 is generally centrally located within channel 12 as in FIG. 1A, gap 102 and gap 104 are substantially equal in size, i.e., width "W5" and width "W6" are substantially equal. In other instances, PRIOR ART miter bar 100 may move laterally as indicated by arrow "L" in FIG. 1A to be closer to third side surface 12F or closer to fourth side surface 12G. In these instances, width "W5" and width "W6" will be of unequal size. The unpredictable widths "W5", "W6" of gaps 102, 104 are what creates the "play" between the PRIOR ART miter bar 100 and the third and fourth sides 12F, 12G of channel 12 described earlier herein.

FIG. 1C shows a situation where a pushing force has been applied to PRIOR ART miter bar 100 and the imaginary midline "ML1" of the PRIOR ART miter bar 100 has inadvertently twisted within channel 12 as indicated by arrow "R" in FIG. 1C and become inclined at an angle α relative to the longitudinal axis "Y1" of channel 12. As a pushing force is applied to the miter gauge to slide PRIOR ART miter bar 100 along channel 12, the PRIOR ART miter bar 100 may not slide smoothly and longitudinally along channel 12 but may instead tend to wobble from side-to-side within channel 12, as indicated by the unnumbered arrow. Periodically the PRIOR ART miter bar 100 may contact third side surface 12F or fourth side surface 12G and become bound up and stopped within channel 12, thereby halting longitudinal motion along channel. The side-to-side wobbling motion and binding up at an angle to the longitudinal axis "Y1" of the PRIOR ART miter bar 100 may cause inaccurately angled cuts or surfaces to be formed in a workpiece being moved by the miter gauge passed a working element of woodworking equipment. Small amounts of movement of the PRIOR ART miter bar 100 within the channel 12 can lead to drastic problems. For example, an error in a workpiece caused by the miter bar 100 being half a degree off-center will be less than a thickness of a pencil line when measured at two inches but will be almost a quarter of an inch measured two feet along the workpiece. These errors may result in cuts or other worked surfaces in the workpiece being oriented at undesired and unintended angles which may result in the workpiece having to be thrown away. Such errors can also cause binding of a cutting blade on a table saw (or other saw) and thereby increase a risk of injury to the craftsman.

Referring now to FIGS. 2-14, there is shown a new miter bar 10 for a miter gauge in accordance with the present disclosure. The new miter bar 10 addresses a number of the shortcomings of PRIOR ART miter bars, such as PRIOR ART miter bar 100 shown in FIGS. 1A-1C.

Figure 2:
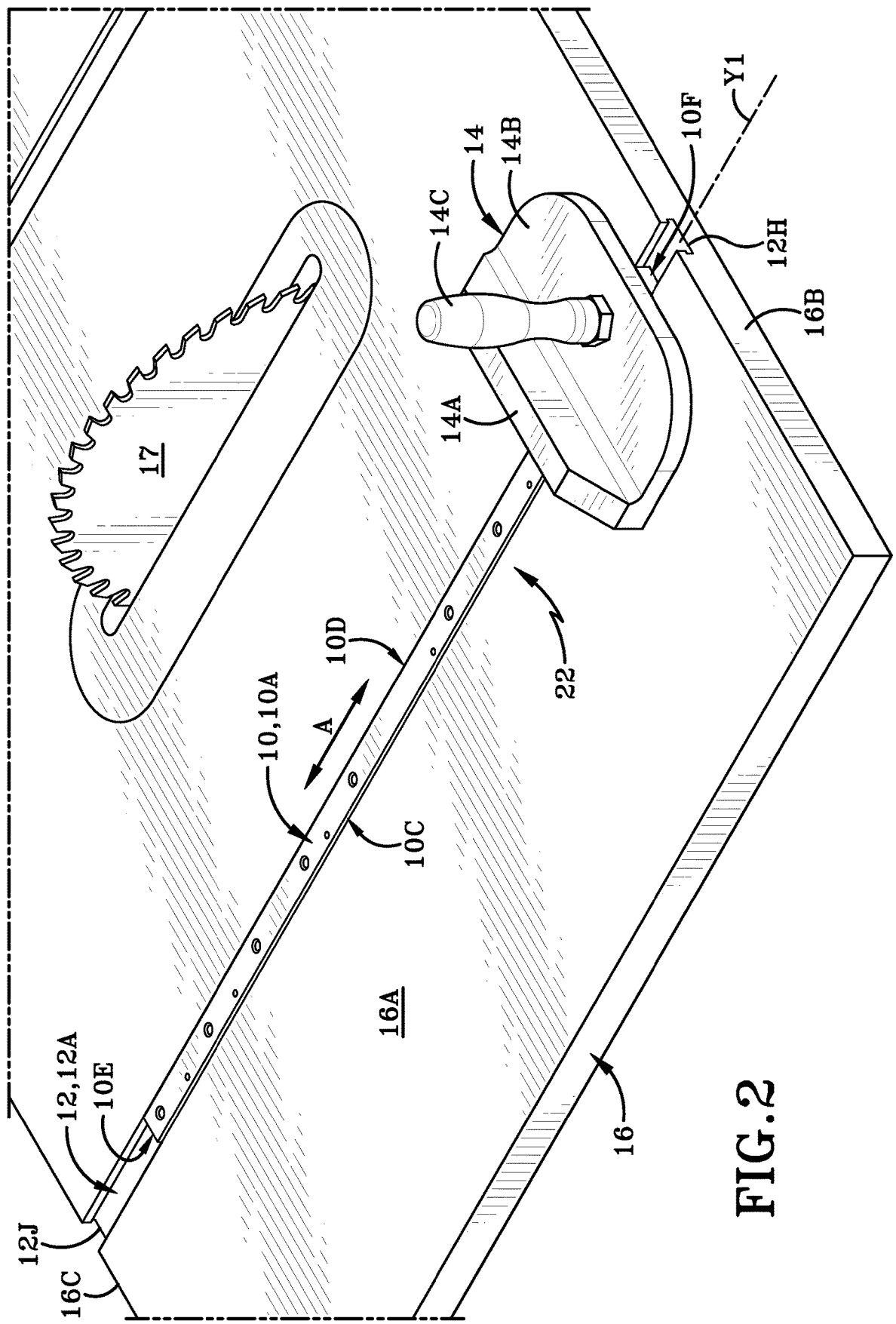
FIG. 2 is a top right side perspective view of an exemplary miter gauge in accordance with the present disclosure and showing the exemplary miter bar received within a channel defined in the worktable.

FIG. 2 shows an exemplary piece of equipment for working a workpiece in accordance with the present disclosure. The piece of equipment, by way of example only, is a table saw that includes a working element 17 and a worktable 16. The working element 17 is in the form of a rotatable sawblade that extends at least partially above the upper surface 16A of worktable 16. A channel 12 (or miter slot) is defined in the upper surface 16A of the worktable 16. The channel 12 and worktable 16 are substantially identical in structure and function to the channel 12 and worktable 16 described earlier herein with respect to FIGS. 1A to 1C and therefore the entire description of these components will not be repeated herein. Channel 12 includes a wider first region 13 (FIG. 10) and a narrower second region 15 arranged such that channel 12 is an inverted T-shape in cross-section. Channel 12 is bounded and defined by a bottom surface 12A, a first side surface 12B, a second side surface 12C, a first shoulder 12D, a second shoulder 12E, a third side surface 12F, and a fourth side surface 12G. First and second shoulders 12D, 12E are arranged along a common plane "P" (FIG. 10). Wider first region 13 is located below plane "P" and narrower second region 16 is located above plane "P". First region 13 is of a width "W1" and a height "H1". Second region 15 is of a width "W2" and a height "H2". As discussed earlier herein with respect to FIGS. 1A-1C, width "W1" is greater than width "W2".

As is readily seen in FIG. 1, channel 12 is oriented substantially parallel to the sawblade 17 and is spaced a distance laterally away from the sawblade. It should further be noted from FIG. 2 that channel 12 has a first end 12H which originates in an opening in the front end 16B of worktable 16 and a second end 12J which terminates in an opening defined in the rear end 16C of worktable 16. Channel 12 has a longitudinal axis "Y1" which extends between first end 12H and second end 12J and is oriented orthogonally to front end 16B and rear end 16C of worktable 16.

Figure 3:
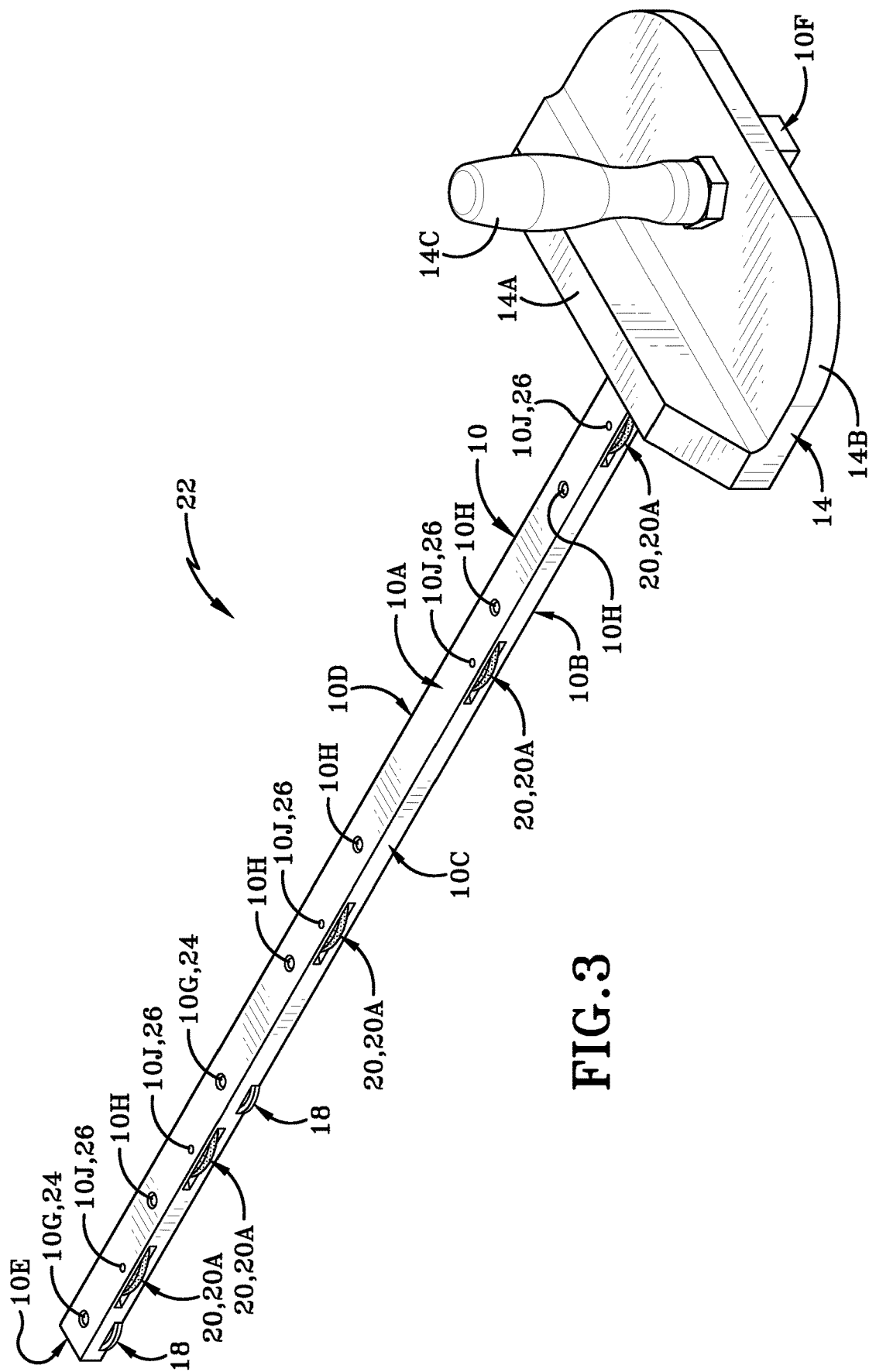
FIG. 3 is a top right side perspective view of the exemplary miter gauge of FIG. 2 shown in isolation.
Figure 4:
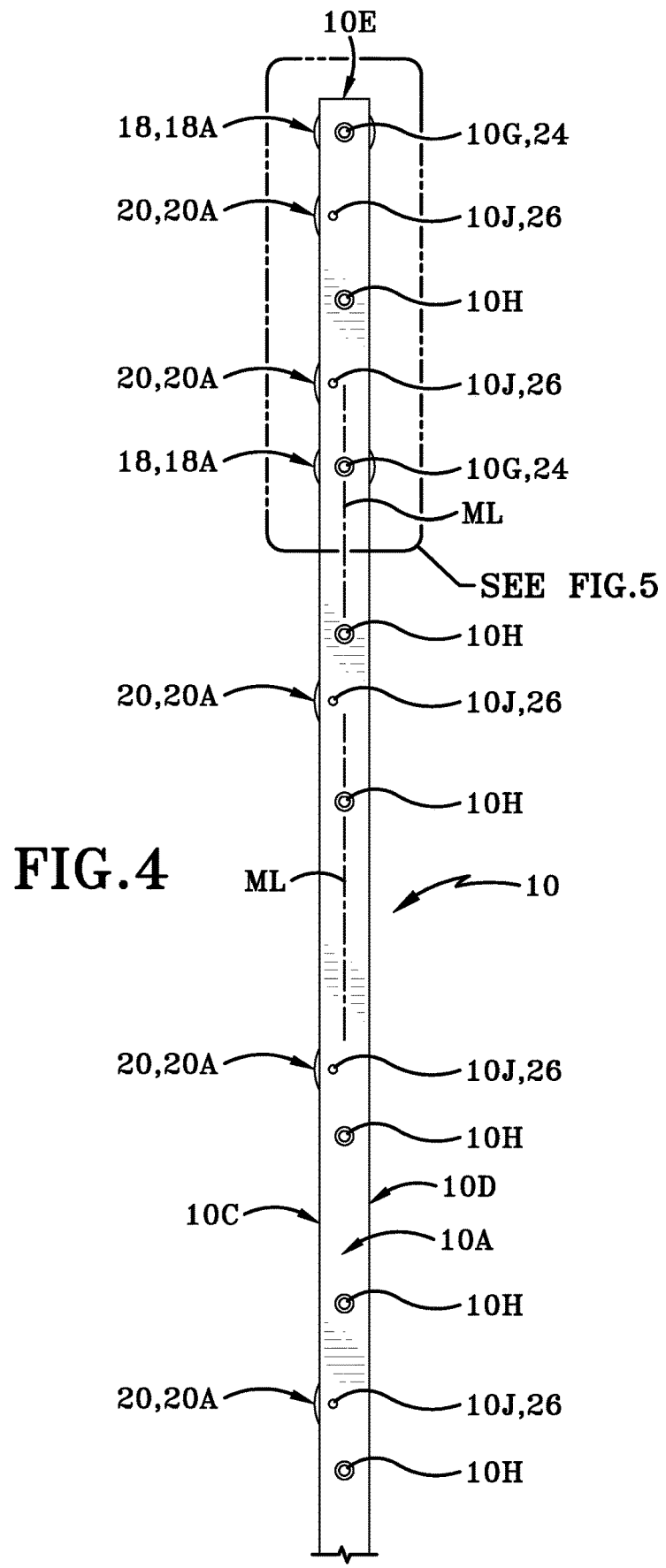
FIG. 4 is a top plan view of a portion of the exemplary miter bar.

FIG. 2 shows the exemplary miter gauge 22 engaged in the channel 12 of worktable 16 and shows that the miter gauge 22 is movable along channel 12 as indicated by arrow "A". FIG. 3 shows, in isolation, the exemplary miter gauge 22 in accordance with the present disclosure.

Referring to FIG. 3, miter gauge 22 comprises a miter bar 10 and a miter fence 14. Miter bar 10 is an elongate body and miter fence 14 is a component that is engaged with the elongate body such that a vertical wall thereof is orthogonal to a longitudinal axis of the elongate body. In other embodiments (not shown herein), the miter gauge 22 may also include a miter head. The exemplary miter bar 10 is an elongate member having a top 10A and a bottom 10B that is vertically opposed to the top 10A, a first side 10C and a second side 10D that is horizontally disposed from the first side 10C, and a first end 10E and a second end 10F that is longitudinally disposed from the first end 10E. Miter bar 10 has a midline "ML" which extends between first end 10E and second end 10F.

Miter bar 10 is of a length measured from first end 10E to second end 10F of from about 12 inches up to about 48 inches. In a further embodiment, miter bar 10 is of a length of from about 18 inches up to about 36 inches. In yet another further embodiment miter bar 10 is of a length of from about 22 inches up to about 26 inches. In a yet further embodiment miter bar 10 is of a length of about 25 inches.

Figure 15:
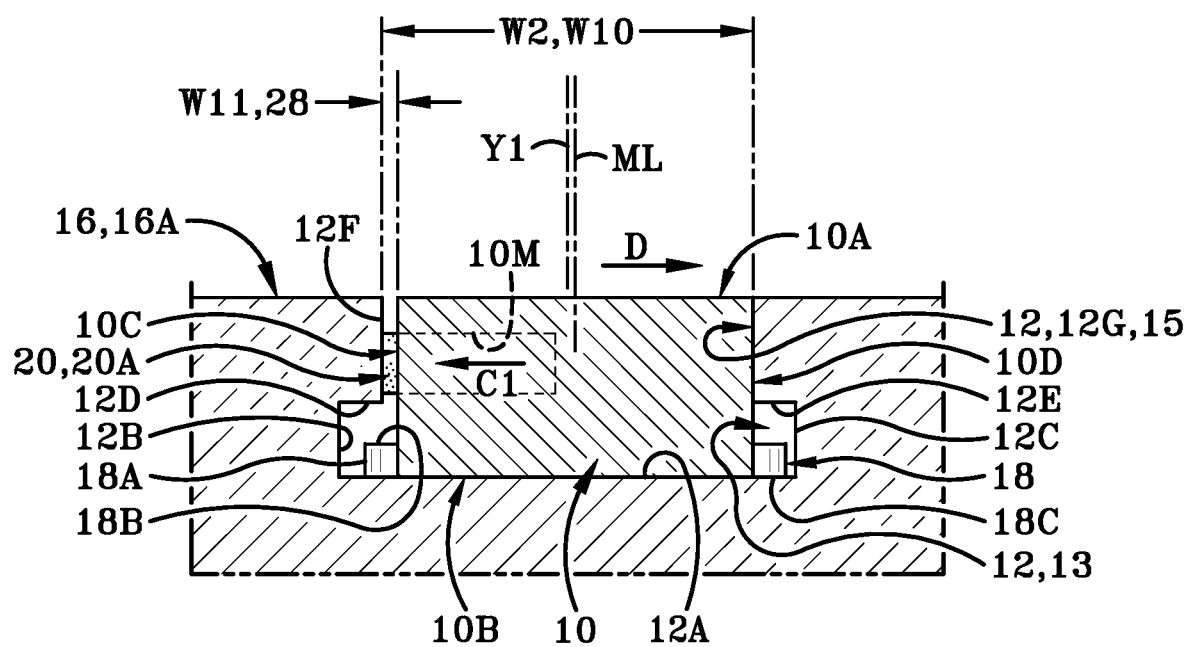
FIG. 15 is a lateral cross-section of the miter bar in accordance with the present disclosure seated in the channel and taken along line 15-15 of FIG. 14.

Referring to FIG. 8, miter bar 10 is of a height "H7" measured between top 10A and bottom 10B, and is of a width "W7" measured between first side 10C and second side 10D. Width "W7" is smaller than the width "W2" (FIG. 10) of the second region 15 of channel 12 and, as a result, miter bar 10 is readily received within channel 12. (Obviously, width "W7" is also smaller than the width "W1" of first region 13 of channel 12.) The height "H7" of miter bar 10 is illustrated in FIG. 15 as being of substantially the same as the height "H1" plus "H2" of channel 12. This height "H7" of miter bar 10 places top 10A of miter bar 10 in substantially the same plane as upper surface 16A of worktable 16. Consequently, when a workpiece is placed on top 10A of miter bar 10 and butted up against miter fence 14 (as will be described later herein), the workpiece will be easily moved by miter gauge 22 relative to upper surface 16A.

It will be understood, however, that in other embodiments, the height "H7" of miter bar 10 may be less than the height of the channel 12 measured from upper surface 16A of worktable 16 to bottom 12A of channel. In these instances the top 10A of miter bar 10 will be recessed relative to upper surface 16A of worktable 16 and the miter fence 14 will move the workpiece relative to the upper surface 16A and the working element 17. In other embodiments, the height "H7" of the miter bar 10 may be greater than the height of the channel 12 and the top 10A of miter bar 10 may be raised relative to upper surface 16A of worktable. This latter instance is not particularly desirable as it may cause some slight instability in a workpiece moved by miter gauge 22 relative to working element 17.

Miter bar 10 defines a pair of apertures 10G therein which extend between top 10A and bottom 10B. A first aperture 10G is located proximate first end 10E of miter bar 10. A second aperture 10G is located a distance longitudinally away from the first aperture 10G. The apertures 10G are located along an imaginary midline "ML" (FIG. 4) of miter bar 10. The imaginary midline "ML" is essentially a longitudinal axis of the miter bar and is located equidistant from first side 10C and second side 10D of miter bar 10 and orthogonal to the first side 10C and second side 10D. The purpose of apertures 10G will be described later herein.

Miter bar 10 further defines a plurality of openings 10H therein which extend between top 10A and bottom 10B. Openings 10H are spaced a distance longitudinally apart from one another along the imaginary midline "ML" of miter bar 10. A first of the openings 10H is located between the first and second apertures 10G. The remaining openings 10H are located at intervals along the length of miter bar with a last one of the openings 10H being located proximate second end 10F of miter bar 10. The purpose of openings 10H will be described later herein.

Miter bar 10 further defines a plurality of holes 10J therein which extend between top 10A and bottom 10B. Holes 10J are spaced a distance longitudinally apart from one another and are offset to one side of midline "ML". In particular, each hole 10J is located between midline "ML" and first side 10C of miter bar 10. The first of the holes 10J is located between the first aperture 10G and the first opening 10H. The second of the holes 10J is located between the first opening 10H and the second aperture 10G. For the rest of miter bar 10 from the second aperture 10G, each hole 10J is located between two adjacent holes 10J. The purpose of holes 10J will be described later herein.

It should be noted that the intervals between the apertures 10G, openings 10H, and holes 10J may not be regular or of equal size.

Figure 6:
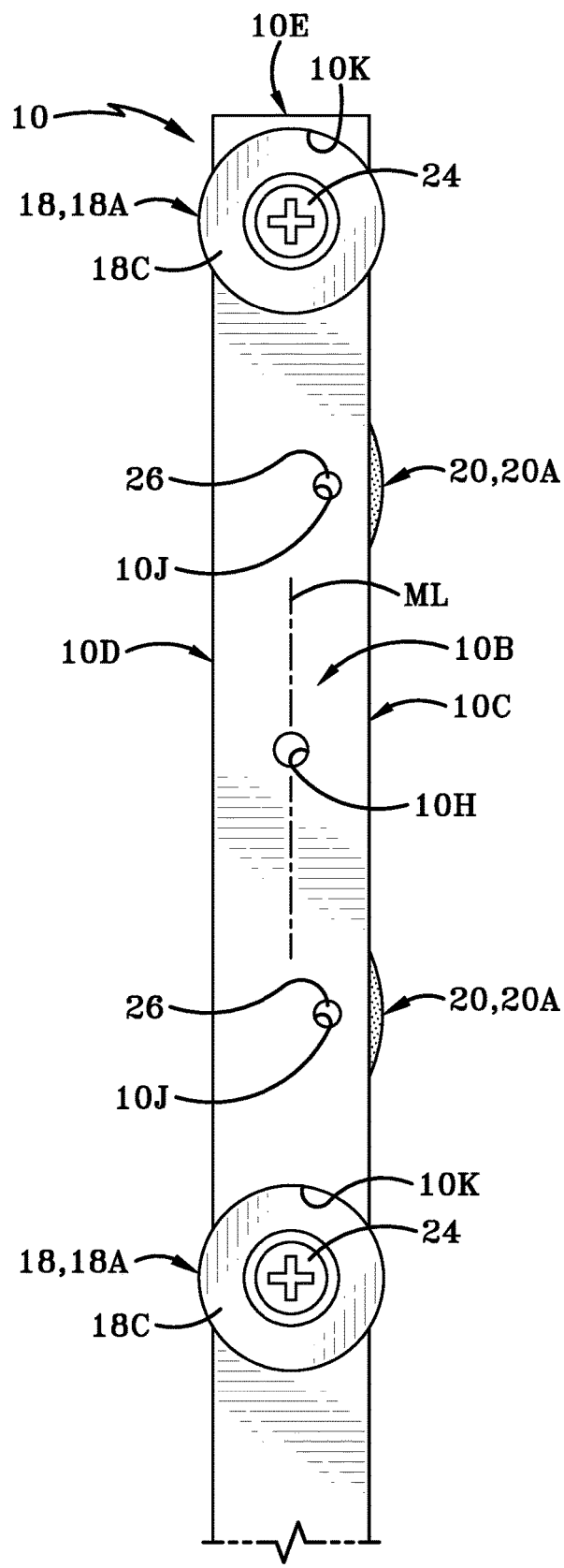
FIG. 6 is a bottom plan view of the enlarged portion of the miter bar shown in FIG. 5.

In accordance with the present disclosure, miter bar 10 is provided with at least one retaining member that helps to keep miter bar 10 seated in channel 12 and prevents miter bar 10 from lifting vertically out of channel 12. FIG. 6 shows that, by way of example only, that the at least one retaining member comprises a pair of track washers 18. Each track washer 18 is seated in a discrete depression 10K (FIGS. 3 and 7) defined in bottom 10B of miter bar 10. Each aperture 10G is aligned with a central region of one of the depressions 10K defined in miter bar 10. Each track washer 18 is placed in one of the depressions 10K in such a way that a through-hole (not shown) defined in the track washer 18 aligns with one of the apertures 10G defined in miter bar 10. A fastener 24 is inserted through the through-hole in the track washer 18 and is press-fitted into the associated aperture 10G to secure the track washer 18 to miter bar 10.

As shown in FIG. 6, each track washer 18 is generally circular in configuration and includes a circumferential outer edge 18A, a top surface 18B, and a bottom surface 18C. When track washer 18 is seated in the associated depression 10K, bottom surface 18C of track washer 18 is substantially flush with bottom 10B of miter bar 10. This can be seen in FIG. 7. Consequently, when miter bar 10 is received in channel 12 of worktable 16, bottom surface 18C of track washer 18 will contact bottom 12A of channel 12 along with bottom 10B of miter bar 10.

Figure 5:
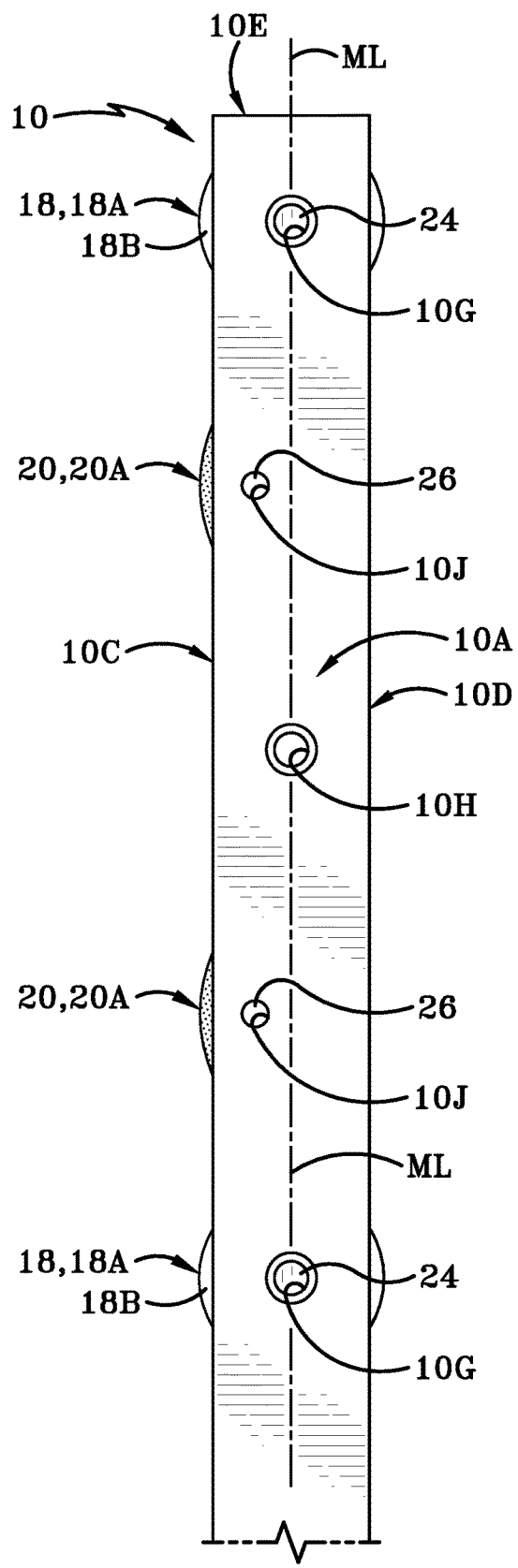
FIG. 5 is an enlarged top plan view of a highlighted portion of the miter bar shown in FIG. 4.

As is evident from FIGS. 5, 6, and 8, each track washer 18 is of a diameter that is greater than the width "W7" of miter bar 10. As a consequence, at least a portion of an outer edge 18A of each track washer 18 extends laterally outwardly beyond each of the first side 10C and second side 10D of miter bar 10 (FIG. 8). The diameter of each track washer 18 is indicated as width "W8" (FIG. 8). The width "W8" of the track washers 18 is greater than width "W7" of the miter bar 10 and the width "W2" of the second region 15 of channel 12. The width "W8" of track washers 18 is smaller than the width "W1" of first region 13 of channel 12. Each track washer 18 has a height "H8" (FIG. 8) which is smaller than the height "H1" of first region 13 of channel 12. Consequently, when first end 10E of miter bar 10 is inserted into first end 12H (FIG. 2) of channel 12, the two track washers 18 will be seated in first region 13 of channel 12 and will act as retaining members that prevent miter bar 10 from moving vertically upwardly out of channel 12. This arrangement is shown in FIG. 15.

The track washers 18 in certain embodiments are stationary and will not rotate. In other embodiments, the track washers 18 are operative to rotate around a vertical axis extending along a shaft of fastener 24. In an exemplary embodiment a longitudinal distance from a first retaining member (i.e., track washer 18) to a second retaining member (i.e., another track washer 18) is from about 3 up to about 7 inches. In an alternative embodiment the distance is about 5 inches.

While track washers 18 will retain miter bar 10 within the channel 12 and prevent the same from lifting vertically upwardly out of channel 12, track washers 18 do not particularly reduce the "play" between miter bar 10 and the third and fourth surfaces 12F, 12G of channel 12.

In accordance with an aspect of the present disclosure, miter bar 10 is provided with at least one spacer member 20. The at least one spacer member 20 is provided to reduce the extent of the "play" between miter bar 10 and channel 12. As illustrated in the attached figures, four spacer members 20 are provided on miter bar 10, with two of the four spacer members 20 being located proximate first end 10E of miter bar 10 and the other two of the four spacer members 20 being located proximate second end 10F. In other embodiments, different numbers and arrangements of spacer members may be provided on miter bar 10.

Spacer members 20 will be further described herein with particular reference to FIGS. 3 and 7. A plurality of slots 10M is defined in first side 10C of miter bar 10. Slots 10M are longitudinally spaced from one another along the length of miter bar 10 and in such a way that each hole 10J defined in miter bar 10 is vertically aligned with a central region of one of the slots 10M defined in side 10C. As best seen in FIGS. 7 and 8, a bottom of each slot is located a height "H5" from bottom 10B of miter bar 10. "H5 is greater than the height "H1" of wider first region 13 of channel 12. As a consequence, spacer member 20 will contact the third side surface 12F which defines channel 12.

Each of the slots 10M extends inwardly from first side 10C towards second side 10D and terminates generally in vertical alignment with imaginary midline "ML". The spacer members 20 are each received within one of these slots 10M. When miter bar 10 is received in channel 12, the slots 30 in miter bar 10 will be located in the narrower second region 15 of channel 12. In particular, each slot 30 will be located opposite third side surface 12F of channel 12. This will be discussed further later herein.

Figure 9:
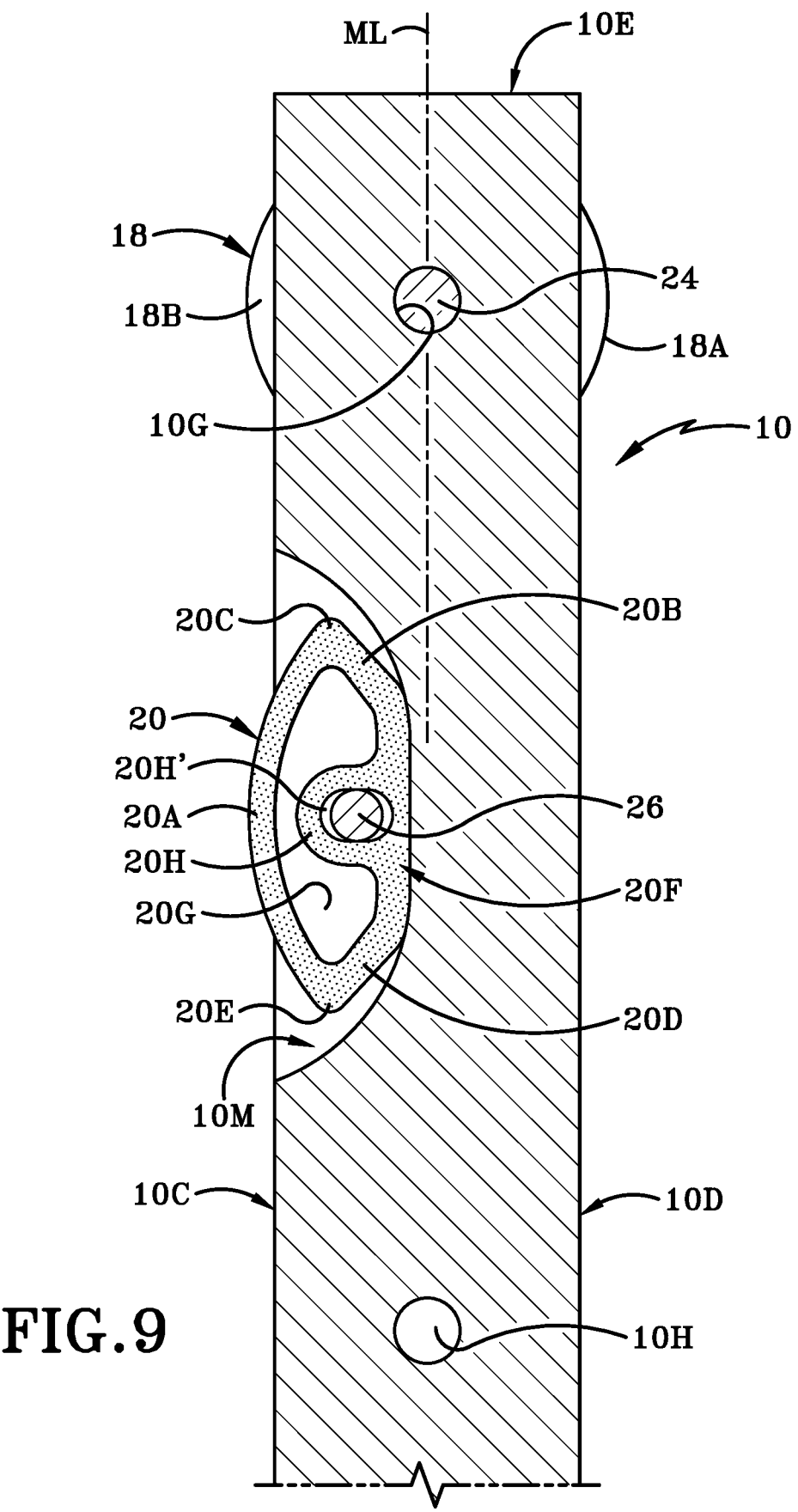
FIG. 9 is a cross-section of exemplary miter bar shown looking in the direction of line 9-9 of FIG. 7.

As best seen in FIG. 9, each slot 10M is generally a reverse C-shaped recess that is defined by a concavely arcuate wall 10M'. Consequently, the slot 10M is widest at its opening in first surface 10C and narrows in width moving in a direction away from first surface 10C and towards second surface 10D.

A spacer member 20 is shown in FIG. 9 engaged in one of the slots 10M defined in first side 10C. Spacer member 20 is generally an inverted D-shape when viewed from above as in FIG. 9. Spacer member 20 has a convexly curved outer wall 20A, a first wall 20B that meets outer wall 20A at a first corner 20C, and a second wall 20D angle inwardly and rearwardly away from first corner 20C and second corner 20E and towards one another. An inner wall 20F extends between first wall 20B and second wall 20C. Outer wall 20A, first corner 20C, first wall 20B, inner wall 20F, second wall 20D, and second corner 20E bound an define a central space 20G. The configuration of spacer member 20 allows outer wall 20A to flex inwardly into central space 20G and relative to inner wall 20F when a depressive force is applied to outer wall 20A. Corners 20C, 20E help promote deformation of spacer member 20 and help spacer member 20 to return to its original configuration when the depressive force is removed.

A connection region 20H extends from a central region of inner wall 20F and for a distance into central space 20G. Connection region 20H defines an opening 20H' therein. As is shown in FIG. 9, opening 20H' is generally elliptical or ovoid. When spacer member 20 is seated in slot 10M, opening 20H' will align with one of the holes 10J (defined in miter bar 10. A retaining mechanism 26 extends through the hole 10J and opening 20H' to secure spacer member 20 to miter bar 10. In one embodiment the retaining mechanism 26 is a post which extends from top 10A to bottom 10B of miter bar 10 through 10J. In one embodiment the post may be hollow.

The generally C-shaped slot 10M houses the spacer member 20 and extends for a distance beyond the first corner 20B and the second corner 20C at the opposed ends of outer wall 20A. As shown in FIG. 9, a portion of outer wall 10A extends for a distance outwardly beyond first side 10C. In other words, the slot 10M is of a shallower width than the width of the spacer member 20. In the exemplary embodiment, the portion of outer wall 20A which extends beyond first side 10C does not extend outwardly therefore to the same extent as does the portion of the track washer 18 that also extends outwardly beyond first side 10C. This can be seen in FIG. 8, wherein the width of the miter bar 10 measured where the spacer member 20 extends outwardly from the first side 10C is of a width "W9". The width "W9" is smaller than the width "W8" of the track washer 18 but is greater than the width "W7" of the miter bar 10. It should be noted that the width "W9" is measured when the spacer member is in an at-rest or non-deformed position, i.e., when no depressive force is being applied thereto. The default position of the spacer member 20 is the at-rest or non-deformed position. In other words, spacer member 20 is biased to the non-deformed position.

In an exemplary embodiment spacer member 20 is manufactured from a material that is capable of being deformed when force is applied thereto, i.e., will change one or both of its shape and position, but when the force is removed, the material is sufficiently flexible and resilient enough to return to its original shape and position. In other words, spacer member 20 is fabricated from a material that is able to be compressed under force and when that force is removed, the material will return to its original position and configuration. In one embodiment spacer member 20 is made of spring steel. In yet another embodiment spacer member 20 is made from a soft rubber material with a Shore A hardness of from about 5 up to about 50. In another embodiment spacer member 20 is made from a semi-rigid rubber material with a Shore A hardness of from about 50 up to about 80. In another embodiment, spacer member 20 is made of a soft rubber with a Shore D hardness of from about 6 up to about 12. In yet another embodiment spacer member 20 is made of a semi-rigid rubber with a Shore D hardness of from about 12 up to about 29. In another embodiment spacer member 20 is made of silicone, thermoplastic elastomers, or polyurethane.

Referring again to FIGS. 2 and 3, the miter fence 14 is illustrated as being located proximate the second end 10F of the miter bar 10. Miter fence 14, as illustrated, is generally L-shaped when viewed from a side as in FIG. 2. Fence 14 includes a vertical wall 14A which extends upwardly from a horizontal base plate 14B. A handle 14C is engaged with the base plate 14B via a connector (not shown) that extends outwardly and downwardly from the handle 14C and through an opening defined in base plate 14B. The connector is selectively receivable in any one of the plurality of openings 10H defined in miter bar 10. As illustrated in FIGS. 2 and 3, the connector is engaged in one of the openings 10H located proximate second end 10F of miter bar 10. In an exemplary embodiment, openings 10H may be threaded and the connector on miter fence 14 is complementarily threaded. In an alternative embodiment, the openings 10H are not threaded but are smooth and the connector is configured so as to be securely engageable therein.

FIGS. 2 and 3 show a miter fence 14 that is secured to miter bar 10 in a fixed or static position. In other words, vertical wall 14A will always be oriented at right angles to the midline "ML" of miter bar 10. It will be understood, however, that in other embodiments (not shown herein), miter fence 14 may be pivotally engaged with miter bar 10 such that the angle of the vertical wall 14A may be oriented at an angle other than orthogonal to midline "ML". In yet other embodiments (not shown herein), miter gauge 22 may also include a miter head which enables miter fence 14 to be pivoted in such a way as to be set at a specific pre-selected angle relative to the midline "ML" of miter bar 10.

Having thus described an exemplary non-limiting configuration of the exemplary miter bar 10, the operation of the miter bar 10 will be discussed hereafter with reference to various exemplary features provided on some of the various embodiments.

Figure 11:
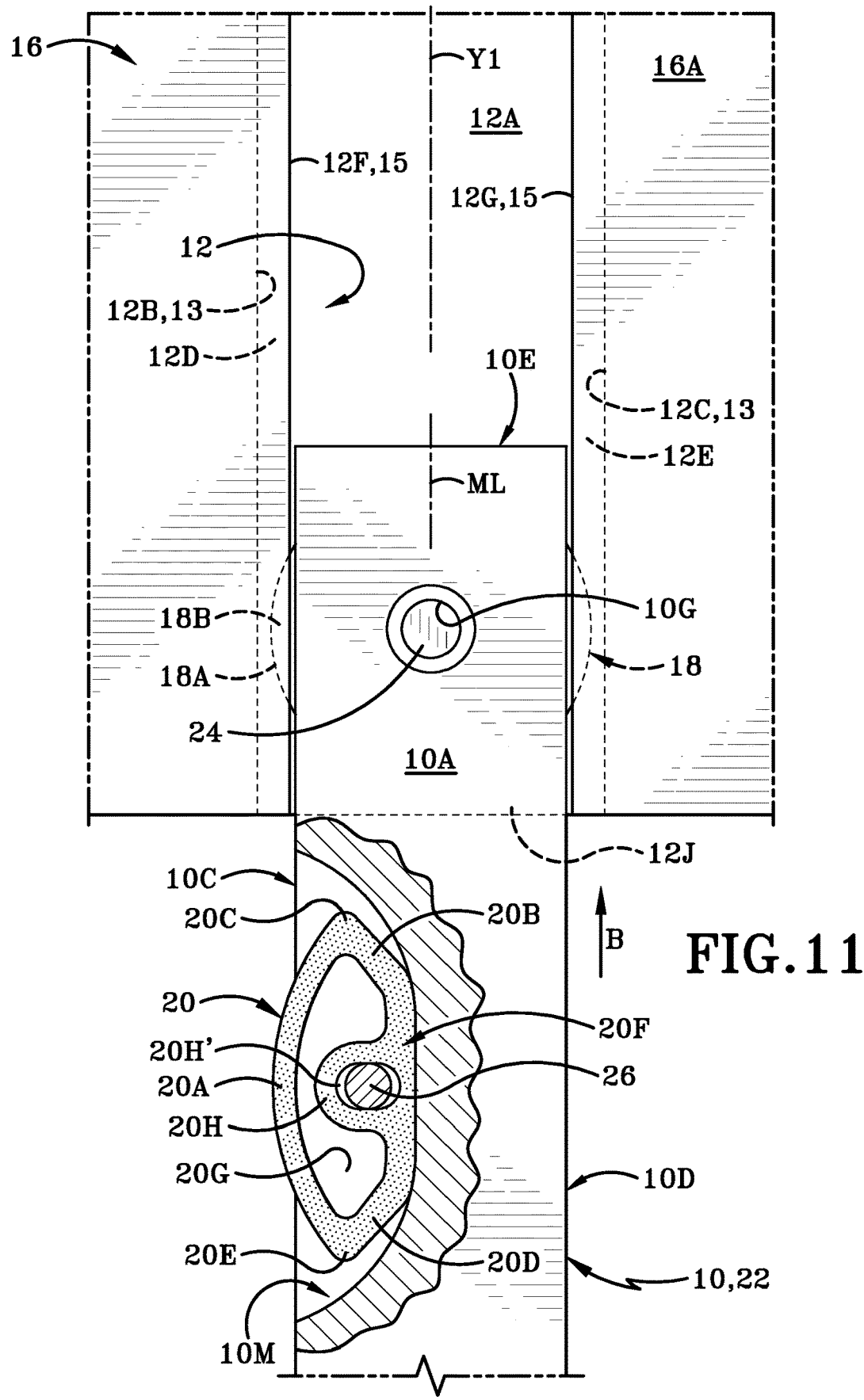
FIG. 11 is a top plan view of the miter bar in accordance with the present disclosure being introduced into the channel defined in the workpiece and including a cut-away in which a region of the miter bar proximate a spacer member is shown.

The use of miter gauge 22 and particularly the miter bar 10 thereof, will now be described with reference to FIGS. 11 to 14. FIG. 11 shows miter bar 10 being initially inserted into an opening at the first end 12H of channel 12 defined in the front end 16B of worktable 16. FIG. 11 shows, in phantom, a first track washer 18 entering the wider first region 13 of channel 12 and the rest of the miter bar 10 entering the narrower second region 15 of channel 12. As miter bar 10 is inserted into channel 12, the bottom 10B of miter bar 10 and the bottom surface 18C of leading track washer 18 are placed in contact with the bottom surface 12A of the channel 12, and the outer edge 18A of the track washer 18 is positioned between the first side surface 12B and the second side surface 12C of the channel 12. It can be seen from FIG. 11 that spacer member 20 is in its at-rest position (also referred to herein as the spacer member's "first position") where outer wall 20A is not convex in shape. In this first position, outer wall 20A extends outwardly beyond first side 10C of miter bar 10 to its greatest extent. The miter bar 10 of the miter gauge is pushed further into channel 12 in the direction of arrow "B". This is accomplished by the user grasping handle 14C (FIG. 2) and applying a pushing force to the same to slide miter bar 10 along channel 12 moving in a direction "B" from front end 16B of worktable 16 towards rear end 16C thereof.

Figure 12:
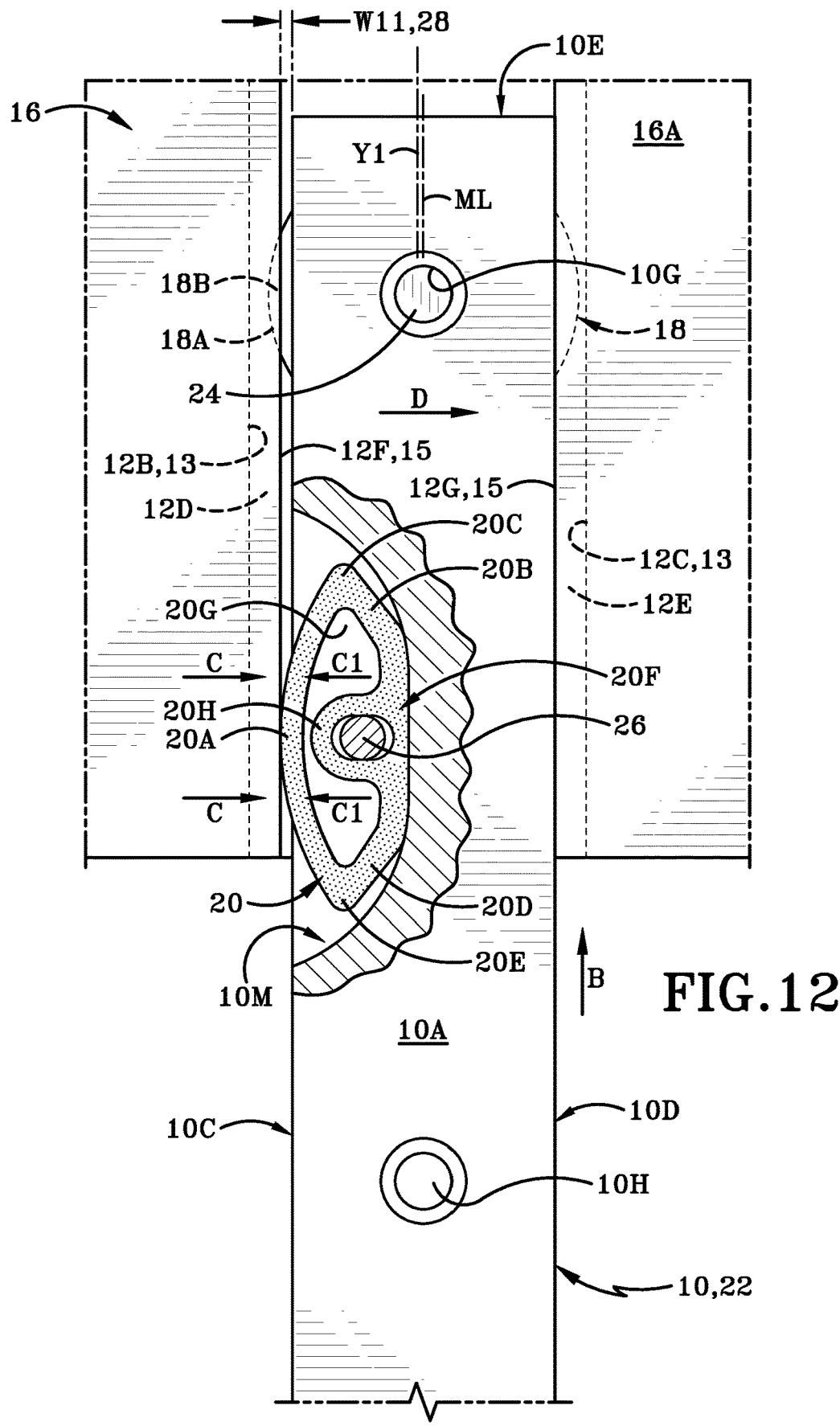
FIG. 12 is a top plan view of the miter bar of FIG. 11 pushed further into the channel in the workpiece so that the region of the miter bar which includes the spacer member is received within the channel.

FIG. 12 shows a further operational view of miter bar 10 when the miter bar has moved along channel 12 for a distance and the first spacer member 20 has entered into the channel 12. As the first spacer member 20 enters channel 12, the outer wall 20A thereof will contact third side surface 12F of channel 12. The third side surface 12F will effectively apply a pushing force "C" on outer wall 20A, depressing or compressing the outer wall 20A inwardly into central space 20G and towards the inner wall 20F of the spacer member 20. In this depressed or compressed state, the spacer member 20 may be considered to be in a second position. The pushing force "C" will deform outer wall 20A, deflecting it inwardly somewhat, and changing the overall shape of the outer wall 20A. The outer wall 20A will, however, still extend for a distance outwardly beyond first side 10C of miter bar 10 but just not to the same extent as when spacer member was in the first position. The pushing force "C" also tends to shift the miter bar 10 laterally within channel 12 in the direction indicated by arrow "D". The lateral motion of miter bar 10 brings a portion of the second side 10D of miter bar 10 into contact with fourth side surface 12G of channel 12. It should be noted outer wall 10A attempts to rebound to its original shape and position and thereby applies an equal but opposite force "C1" to third side surface 12F of channel 12. As a consequence, first spacer member 20 remains in contact with third side surface 12F and the portion of the miter bar 10 opposite first spacer member 20 is maintained in contact with fourth side surface 12G of channel. This arrangement substantially reduces the "play" between the miter bar 10 and the channel 12. It should be noted from FIG. 15 that first spacer member 20 operates entirely within the narrower second region 15 of channel 12.

First spacer member 20 is of a wider width when in the non-compressed or expanded position prior to entering into the channel 12. When the first spacer member 20 is in the first position, the overall width of the miter bar 10 measured from the outer wall 20A of the first spacer member 20 to the second side 10D of the miter bar 10 is "W9" (FIG. 8). When first spacer member 20 has entered into channel 12 and become compressed and thereby moved into a second position, the overall width of the miter bar measured from the outer wall 20A of the first spacer member 20 to the second side 10D is "W10" (FIG. 15). The width "W10" closely approximately the width "W2" of the narrower second region 15 of channel 12. As a consequence, "play" between the miter bar 10 and channel 12 is greatly reduced. This can be seen in FIG. 14 and FIG. 15 which shows that a gap 28 (FIGS. 12, 14, 15) of a consistent width "W11" is defined between first side 10C of miter bar 10 and third side surface 12F of channel 12 and that this gap 28 is maintained along substantially the entire length of the miter bar 10 received within channel 12. The fact that the gap 28 remains a consistent width along the length of miter bar 10 helps to ensure that any cuts made in a workpiece that is manipulated relative to a working element 17 by miter gauge 22 will be at a desired preset angle.

The user will continue to push on miter bar 10 and move the same further into the channel 12 in the direction indicated by arrow "B" until a second spacer member 20 (FIG. 13) enters channel 12. It should be noted that as miter bar 10 slides along channel 12, the track washer 18 will remain in the wider first region 13 of channel 12, thereby preventing the miter bar 10 from lifting vertically out of channel 12. Additionally, as miter bar 10 slides along channel 12, the first spacer member 20 remains in contact with third side surface 12F and the portion of the second side 10D of miter bar 10 located opposite the first spacer member 20 remains in contact with fourth side surface 12G.

Second spacer member 20 (FIG. 13) enters channel 12 in a similar manner to the way in which first spacer member 20 entered channel (as shown in FIG. 12). As the second spacer member 20 contacts third side surface 12F of channel 12, the outer wall 20A thereof is depressed inwardly by a force acting in the direction indicated by arrow "C" (FIG. 12). This causes the outer wall 20A of the second spacer member 20 into the central space 20G and a portion of the miter bar 10 is pushed into contact with fourth side surface 12G of channel 12 as indicated by arrow "D" (FIG. 12). Outer wall 20A attempts to rebound to its original position under spring force, thereby applying an equal but opposite force "C1" to the third side surface 12F of channel 12. The further reduces the "play" between the miter bar 10 and the channel 12.

Because there are now two locations on the miter bar that are retained in contact with both of the third side surface 12F and fourth side surface 12G of the channel 12, substantially any tendency of the miter bar 10 to twist laterally within channel 12 towards one or the other of the third side surface 12F and fourth side surface 12G is greatly reduced. In other words, the spacer members 20 reduce twisting moments in the miter bar 10. As a result of the retaining members 18 (i.e., track washers 18) and spacer members 20 being provided on miter bar 10, the miter bar 10 sufficiently resists rotational motion within channel 12 whether stationary or while moving parallel to longitudinal axis "Y1" of channel 12. Furthermore, the length of the miter bar 10, while in excess of the distance between the two retaining members 18 and the distance between the spacer members 20, is stable when engaged in the channel. This arrangement allows a user to correctly align larger workpieces with the working element 17.

The maintaining of the miter bar 10 in contact with third side surface 12F and fourth side surface 12G as the miter bar 10 moves in the direction "B" happens automatically. No adjustment of the various components of the miter bar is required to be made by the user in order to keep the miter bar 10 moving fluidly along channel 12 in a direction parallel to the longitudinal axis "Y1" of channel 12.

Figure 13:
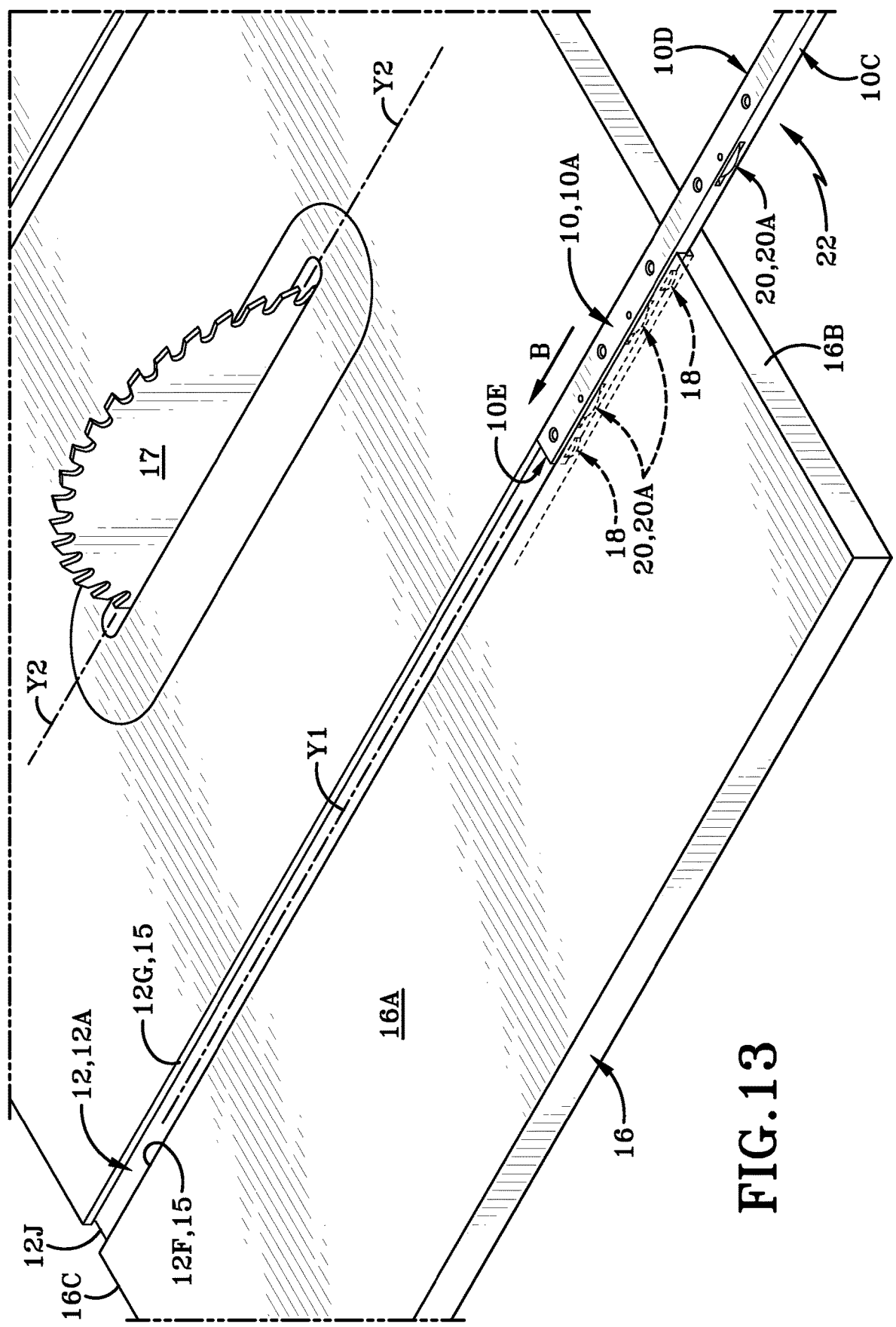
FIG. 13 is a top right side perspective view of the exemplary miter gauge pushed further into the channel defined in the workpiece relative to FIG. 12.
Figure 14:
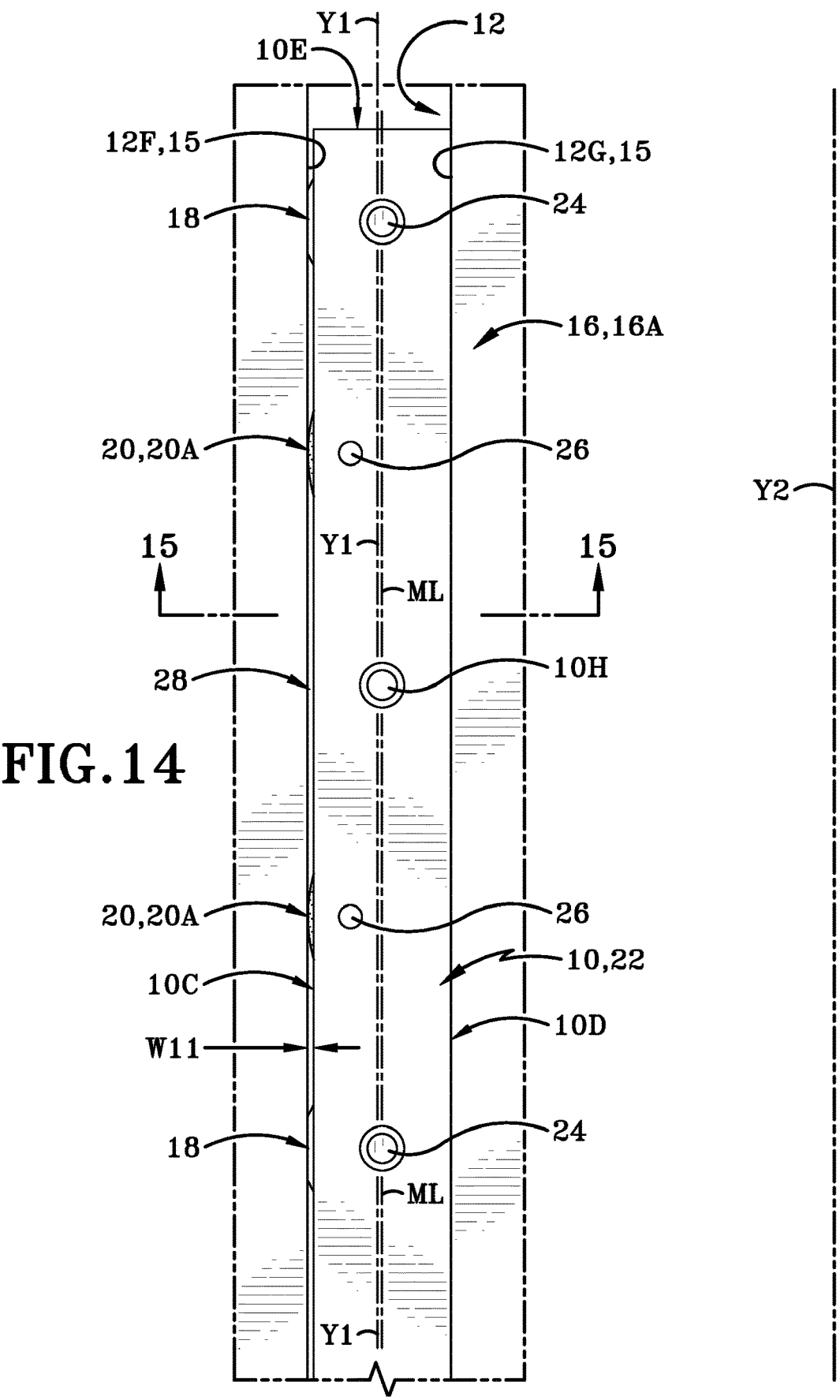
FIG. 14 is a top plan view of the miter bar being moved even further into the channel relative to FIG. 13 and showing two spacer members contacting the side wall of the worktable which defines the channel.

Continued movement of the miter bar 10 along channel 12 in the direction of arrow "B" will bring the second of the track washers 18 into the channel 12 as shown in FIGS. 13 and 14. Further continued movement will ultimately cause additional spacer members 20 to enter into channel 12 and the movement of the miter bar 10 will remain parallel to the longitudinal axis "Y1". As a result, when a workpiece is butted up against the vertical wall 14A of miter fence 14 and is moved relative to the cutting blade 17, any cut made in the workpiece will be true to the intended angle desired by the user. This is because, as shown in FIGS. 13 and 14, the midline "ML" of the miter bar 10 travels parallel to the longitudinal axis "Y1" of the channel 12 and parallel relative to the longitudinal axis "Y2" along which cutting blade 17 is disposed. As a consequence, the workpiece will tend not to be detrimentally affected by variable positioning of the miter bar 10 within the channel 12 as was the case in prior art miter gauges.

While the spacer member 20 is shown herein as a single, unitary, monolithic body that is integrally molded or formed, it will be understood that in alternative embodiments, spacer member may be fabricated as a series of surfaces and springs so as to apply force to the side of the channel 12 as will be discussed with respect to the operation.

It will be understood that instead of the slots 10M and spacer members 20 being provided on first side 10C of miter bar 10, in other embodiments, the slots 10M and spacer members 20 may be provided on second side 10D of miter bar 10. In this latter instance, the holes 10J and associated retaining members 26, will also be located proximate the second side 10D. In yet other embodiments, slots 10M, spacer members 20 and holes 10J (with their associated retaining members 26) may be provided proximate both of the first side 10C and second side 10D of miter bar 10.

It will further be understood that the miter gauge 22 may readily be moved from a channel in a first worktable to another channel in a second worktable, or from a first channel defined in a worktable to a second channel defined in the same worktable. This can be accomplished by simply sliding the miter bar 10 along the bottom 12A of the channel 12 in an opposite direction to arrow "B" (FIG. 11) until the first end 10E of the miter bar 10 exits the opening in the first end 12H of the worktable 16 and then lining the first end 10E of the miter bar 10 with an entrance of a second and different channel and inserting the first end 10E into that second channel. If the second region of the second channel is of a different width to the second region 15 of the channel 12, the at least one spacer member 20 will automatically adjust to the new and different width of the second region of that second channel. As a result, the miter bar 10 will travel smoothly through the second channel while the at least one spacer member maintains a constant gap 28 between the miter bar 10 and the second channel so that the miter bar 10 travels parallel to the second channel's longitudinal axis during operation of working equipment.

Figure 16:
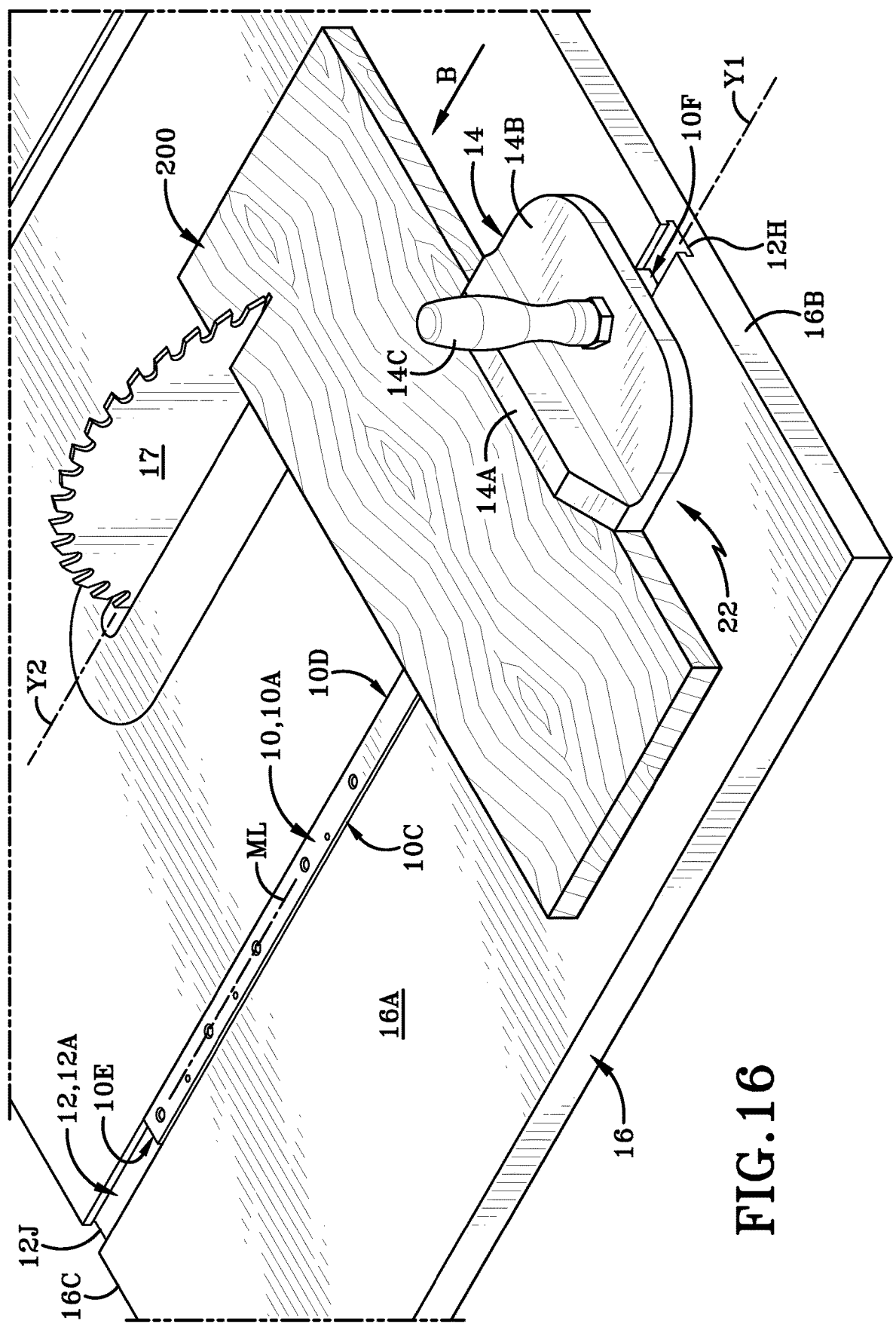
FIG. 16 is a top plan view of a workpiece being supported by the miter gauge and being moved towards a working element which finishes a surface on the workpiece.

Referring now to FIGS. 11 to 16, a method in accordance with an aspect of the present disclosure includes inserting a miter bar 10 into a channel 12 defined in a worktable 16. In particular, the bar 10 is inserted a side comprising first side surface 12B, first shoulder 12D, and third side surface 12F), and an opposite side comprising second side surface 12C, second shoulder 12E, and fourth side surface 12G. The method further includes providing at least one spacer member 20 on a first side 10C of the miter bar 10; applying a force "C1" to a portion of the first side of the channel 12, i.e., to third side surface 12F, with the at least one spacer member 20; holding the second side 10D of the bar 10 in contact with the second side of the channel, particularly in contact with fourth side surface 12G. The method further includes moving the bar 10 longitudinally within the channel 12 in the direction indicated by arrow "B" while holding the second side 10D of the bar in contact with the second side of the channel 12; operatively engaging a workpiece 200 (FIG. 16) with the bar 10, contacting the workpiece 200 with a working element 17 on the worktable 16; and working a surface on the workpiece 200 with the working element 17. As illustrated in FIG. 16, a cut is made in the workpiece 200 with the sawblade. Because of the configuration of the miter gauge 22, the cut is substantially parallel to the longitudinal axis "Y2" of the sawblade.

The method may further comprise applying a first force "C" to at least one spacer member 20 with the first side of the channel 12, particularly with third side surface 12F, prior to applying the force "C1" to the first side of the channel 12, particularly to third side surface 12F, with the at least one spacer member 20. The method may further comprise laterally moving the bar 10 in the direction indicated by arrow "D" (FIG. 12) towards the second side of the channel 12, particularly towards fourth side surface 12G, prior to holding the second side 10D of the bar 10 in contact with the second side of the channel, particularly fourth side surface 12G. The applying of the force "C1" may further comprise moving the at least one spacer member 20 from an extended position relative to the first side 10C of the bar 10 (as shown in FIG. 11) to a depressed position relative to the first side 10c of the bar 10 (as shown in FIG. 12). Applying the force "C1" may further comprise depressing a flexible outer wall 20A of the at least one spacer member 20 inwardly towards the inner wall 20F, to move the outer wall 20A from a first distance laterally away from the first side 10C of the bar 10 (as shown in FIG. 11) to a second distance laterally away from the first side 10C of the bar 10 as shown in FIG. 12).

The method may further comprise maintaining a gap 28 of a constant width "W11". FIGS. 14 and 15 between the first side 10C of the bar 10 and the first side of the channel 12, particularly with the third side surface 12F of the channel 12, with the at least one spacer member 20. The method may further comprise sliding the bar 10 along a bottom 12A of the channel 12. The method may further comprise resisting twisting of the bar 10 within the channel 12 with the at least one spacer member 20.

The method may further comprise inserting a first region of the bar 12, including first end 10E and at least one retaining member 18, into a first region 13 of the channel 12; inserting a second region of the bar 10 into a second region 15 of the channel 12, wherein the first region of the bar 12 is wider than second region of the bar 12; and placing the first region of the bar 12 in contact with a bottom 12A of the channel 12. The inserting of the first region of the bar 12 into the channel 12 may further comprise contacting the bottom 12A of the channel 12 with at least two retaining members 18 provided on the bottom 10B of the bar 10.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected," "attached" or "coupled" to another feature or element, it can be directly connected, attached or coupled to the other feature or element or intervening features or elements may be present. In contrast, when a feature or element is referred to as being "directly connected," "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under," "below," "lower," "over," "upper," "above," "behind," "in front of," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly," "downwardly," "vertical," "horizontal," "lateral," "transverse," "longitudinal," and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A tool for material processing comprising:
    an elongate body having a top and an opposed bottom, and a first side and a second side extending between the top and bottom; and
    at least one spacer member provided on the first side of the body;
    wherein the at least one spacer member is located within a slot defined in the first side of the body;
    wherein the at least one spacer member includes:
        an outer wall which is convexly curved;
        a first wall which meets a first end of the outer wall at a first corner;
        a second wall which meets a second end of the outer wall at a second corner; wherein the first wall and second wall angle inwardly and rearwardly away from the first corner and the second corner and towards one another; and
        an inner wall which extends between the first wall and the second wall;
        wherein the outer wall, the first wall, the second wall, and the inner wall bound and define a central space;
    wherein the inner wall is located within the slot and the outer wall extends at least partially outwardly from the slot and beyond the first side of the body;
    wherein the outer wall is movable relative to the inner wall and thereby relative to the first side of the body between a first position and a second position; and
    wherein when in the first position, the outer wall is located further outwardly from the first side than when in the second position.

2. The tool according to claim 1, wherein the at least one spacer member is fabricated from a resilient material that deforms under application of a force thereto and returns to an original shape and size when the force is removed.

3. The tool according to claim 1, wherein the at least one spacer member is located a distance vertically away from the bottom of the elongate body.

4. The tool according to claim 1, wherein the elongate body further includes:
    a first end, a second end longitudinally opposed to the first end, wherein the first end and second end extend between the first side and the second side; and
    wherein the at least one spacer member comprises a first spacer member and a second spacer member spaced a distance longitudinally away from the first spacer member.

5. The tool according to claim 4, further comprising a plurality of retaining members secured to the bottom of the body, wherein a retaining member of the plurality of retaining members is located between the first spacer member and the second spacer member; and is located a distance longitudinally from the first spacer member and the second spacer member.

6. The tool according to claim 5, wherein the retaining member of the plurality of retaining members extends laterally outwardly beyond the first side and the second side of the body.

7. The tool according to claim 6, wherein the retaining member extends laterally outwardly beyond the first side of the elongate body and further beyond the outer wall of the at least one spacer member when the outer wall is in the first position and in the second position.

8. The tool according to claim 1, further comprising a fence provided on the body, wherein the fence is oriented orthogonally to the top of the body.

9. The tool according to claim 8, wherein the fence is selectively adjustable about an axis orthogonal to a longitudinal axis of the elongate body.

10. The tool according to claim 1, wherein the elongate body is of a width proximate the top, where the width is measured between the first side and the second side, and wherein at least a portion of the elongate body proximate the bottom thereof is of a greater width than the width proximate the top.

11. The tool according to claim 1, wherein the at least one spacer member is flexible and is fabricated from spring steel.

12. The tool according to claim 1, wherein the at least one spacer member is compressible.

13. The tool according to claim 1, wherein the elongate body is of a length of from about 22 up to about 26 inches.

14. The tool according to claim 1, further comprising a post which extends into the slot and secures the inner wall of the at least one spacer member to the body.

15. The tool according to claim 1, wherein the slot is generally C-shaped and defined by a concavely arcuate wall of the body, and wherein the inner wall of the at least one spacer member abuts the concavely arcuate wall.

16. The tool according to claim 1, wherein the at least one spacer member further comprises a connection region which is U-shaped, wherein the connection region extends outwardly from the inner wall and into the central space bounded by the outer wall, the first corner, the first wall, the inner wall, the second wall, and the second corner.

17. The tool according to claim 16, further comprising:
an aperture bounded and defined by the connection region and the inner wall; and
a connector extending through the aperture and operatively engaging the at least one spacer member to the body.

18. A method of working a surface of a workpiece comprising:
inserting a bar between a first side and a second side of a channel defined in a worktable;
providing at least one spacer member on a first side of the bar, wherein the at least one spacer member is located within a slot defined in the first side of the bar and wherein the at least one spacer member includes an outer wall which is convexly curved, a first wall which meets a first end of the outer wall at a first corner, a second wall which meets a second end of the outer wall at a second corner, wherein the first wall and second wall angle inwardly and rearwardly away from the first corner and the second corner and towards one another, and an inner wall which extends between the first wall and the second wall, wherein the outer wall, the first wall, the second wall, and the inner wall bound and define a central space, and wherein the inner wall is located within the slot and the outer wall extending at least partially outwardly from the slot and beyond the first side of the bar, wherein the outer wall is movable relative to the inner wall and thereby relative to the first side of the bar between a first position and a second position;
applying a force to the first side of the channel with the outer wall of the at least one spacer member;
holding the second side of the bar in contact with the second side of the channel;
operatively engaging a workpiece with the bar;
moving the bar longitudinally within the channel while holding the second side of the bar in contact with the second side of the channel;
contacting the workpiece with a working element on the worktable; and
working a surface on the workpiece with the working element.

19. The method according to claim 18, further comprising:
applying a first force to at least one spacer member with the first side of the channel prior to applying the force to the first side of the channel with the at least one spacer member.

20. The method according to claim 18, further comprising:
laterally moving the bar towards the second side of the channel prior to holding the second side of the bar in contact with the second side of the channel.

21. The method according to claim 18, wherein applying the force comprises:
moving the outer wall of the at least one spacer member from an extended first position relative to the first side of the bar to a depressed second position relative to the first side of the bar.

22. The method according to claim 18, wherein the outer wall is flexible, and wherein applying the force further comprises:
depressing the flexible outer wall of the at least one spacer member inwardly to move the flexible outer wall from a first distance away from the first side of the bar to a second distance away from the first side of the bar.

23. The method according to claim 22, further comprising:
maintaining a constant gap between the first side of the bar and the first side of the channel with the at least one spacer member.

24. The method according to claim 18, further comprising:
sliding the bar along a bottom of the channel.

25. The method according to claim 18, further comprising:
resisting twisting of the bar within the channel with the at least one spacer member.

26. The method according to claim 18, wherein inserting further comprises:
inserting a first region of the bar into a first region of the channel;
inserting a second region of the bar into a second region of the channel, wherein the first region of the bar is wider than the second region of the bar; and
placing the first region of the bar in contact with a bottom of the channel.

27. The method according to claim 26, wherein inserting the first region of the bar into the first region of the channel further comprises:
contacting the bottom of the channel with at least two retaining members provided on the bottom of the bar.

* * * * *